United States Patent
Shi

(10) Patent No.: US 12,552,841 B2
(45) Date of Patent: Feb. 17, 2026

(54) CRA4S1 GENE, ENCODED CRA4S1 PROTEIN, AND APPLICATION

(71) Applicant: Zhenjiang Yangtze Green Biotechnology Co., Ltd., Zhenjiang (CN)

(72) Inventor: Xiaoju Shi, Orpington (GB)

(73) Assignee: ZHENJIANG YANGTZE GREEN BIOTECHNOLOGY CO., LTD., Jiangsu (CN)

( * ) Notice: Subject to any disclaimer, the term of this patent is extended or adjusted under 35 U.S.C. 154(b) by 1038 days.

(21) Appl. No.: 17/613,122

(22) PCT Filed: Dec. 11, 2019

(86) PCT No.: PCT/CN2019/124433
§ 371 (c)(1),
(2) Date: Nov. 22, 2021

(87) PCT Pub. No.: WO2021/017365
PCT Pub. Date: Feb. 4, 2021

(65) Prior Publication Data
US 2022/0204570 A1    Jun. 30, 2022

(30) Foreign Application Priority Data

Jul. 30, 2019  (CN) .......................... 201910699285.5
Dec. 6, 2019  (CN) .......................... 201911247060.2

(51) Int. Cl.
| | |
|---|---|
| C07K 14/195 | (2006.01) |
| A61K 39/02 | (2006.01) |
| A61K 39/116 | (2006.01) |
| A61P 1/02 | (2006.01) |
| A61P 31/04 | (2006.01) |
| C07K 16/1203 | (2026.01) |
| A61K 39/00 | (2006.01) |

(52) U.S. Cl.
CPC ........ *C07K 14/195* (2013.01); *A61K 39/0208* (2013.01); *A61K 39/116* (2013.01); *A61P 1/02* (2018.01); *A61P 31/04* (2018.01); *C07K 16/1203* (2013.01); *A61K 2039/70* (2013.01); *C07K 2319/30* (2013.01)

(58) Field of Classification Search
None
See application file for complete search history.

(56) References Cited

U.S. PATENT DOCUMENTS

| | | | |
|---|---|---|---|
| 2008/0057006 A1* | 3/2008 | Shi | A61K 31/713 |
| 2016/0347829 A1* | 12/2016 | Nordgren | C07K 16/12 |

FOREIGN PATENT DOCUMENTS

| | | |
|---|---|---|
| CA | 2235224 A1 | 5/1997 |
| EP | 4008341 A4 | 1/2024 |
| GB | 2602562 A | 8/2025 |
| JP | 2000083676 A | 3/2000 |
| JP | 2009136300 A | 6/2009 |
| WO | 1999029870 A1 | 6/1999 |
| WO | 2005112992 A1 | 5/2005 |
| WO | 2010022463 | 3/2010 |

OTHER PUBLICATIONS

Chen C, Roberts VA, Stevens S, Brown M, Stenzel-Poore MP, Rittenberg MB. Enhancement and destruction of antibody function by somatic mutation: unequal occurrence is controlled by V gene combinatorial associations. EMBO J. Jun. 15, 1995;14(12):2784-94. (Year: 1995).*
D.J. Milar et al. "Production and characterisation of monoclonal antibodies to the principle sonicate antigens of Porphyromonas gingivalis W50", FEMS Immunology and Medical Microbiology, vol. 7, No. 3, Oct. 31, 1993 (Oct. 31, 1993), ISSN: 1574-695X, see abstract.
GeneBank, "TonB-dependent receptor [Porphyromonas gingivalis]" Genebank: WP_097561170.1, Oct. 29, 2017 (Oct. 29, 2017), see sequence of amino acid and related information.
International Search Report for PCT/CN2019/124433, dated May 9, 2020.
International Written Opinion for PCT/CN2019/124433, dated May 8, 2020.
English translation of the Written Opinion for PCT/CN2019/124433, mailed on May 8, 2020.
SIPO Search report and 1st OA with English translation.
JPO 1st OA, dated Dec. 27, 2022 with English translation.
JPO 2nd OA, dated May 16, 2023 with English translation.
JPO Decision to Grant dated Oct. 27, 2023.

* cited by examiner

*Primary Examiner* — Joanne Hama
*Assistant Examiner* — Estella M. Gustilo
(74) *Attorney, Agent, or Firm* — Lei Fang, Esq.; Smith Tempel Blaha LLC

(57) ABSTRACT

Provided are a cra4S1 gene, an encoded cra4S1 protein, and a vaccine or drug containing the cra4S1 protein or a fragment thereof. A nucleotide sequence of the cra4S1 gene is represented by SEQ ID NO. 1. The vaccine combines the specific target of an outer membrane protein of *Porphyromonas gingivalis* and the antigen component of the bacterial conserved region, which has an immune prevention and protection effect on the body.

10 Claims, 16 Drawing Sheets

Specification includes a Sequence Listing.

Figure 4

SEQUENCE LISTING

```
<160> NUMBER OF SEQ ID NOS: 5

<210> SEQ ID NO 1
<211> LENGTH: 393
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 1
cagaaccgta ccgttaaggg caccgtgatc agcagcgagg acaacgaacc gctgattggt      60
gcgaacgtgg ttgtggttgg caacaccacc atcggtgcgg cgaccgacct ggatggcaac     120
ttcaccctga gcgttccggc gaacgcgaag atgctgcgtg tgagctacag cggtatgacc     180
```

```
accaaagagg ttgcgatcgc gaacgttatg aagattgtgc tggacccgga tagcaaagtg    240
ctggaacagg tggttgtgct gggttatggc accggtcaaa agctgagcac cgttagcggc    300
agcgttgcga aagtgagcag cgagaagctg gcggaaaaac cggtggcgaa cattatggat    360
gcgctgcagg gccaagttgc gggtatgcaa gtg                                 393
```

<210> SEQ ID NO 2
<211> LENGTH: 131
<212> TYPE: PRT
<213> ORGANISM: Porphyromonas gingivalis

<400> SEQUENCE: 2

```
Gln Asn Arg Thr Val Lys Gly Thr Val Ile Ser Ser Glu Asp Asn Glu
1               5                   10                  15

Pro Leu Ile Gly Ala Asn Val Val Val Gly Asn Thr Thr Ile Gly
            20                  25                  30

Ala Ala Thr Asp Leu Asp Gly Asn Phe Thr Leu Ser Val Pro Ala Asn
        35                  40                  45

Ala Lys Met Leu Arg Val Ser Tyr Ser Gly Met Thr Thr Lys Glu Val
    50                  55                  60

Ala Ile Ala Asn Val Met Lys Ile Val Leu Asp Pro Asp Ser Lys Val
65                  70                  75                  80

Leu Glu Gln Val Val Val Leu Gly Tyr Gly Thr Gly Gln Lys Leu Ser
                85                  90                  95

Thr Val Ser Gly Ser Val Ala Lys Val Ser Ser Glu Lys Leu Ala Glu
            100                 105                 110

Lys Pro Val Ala Asn Ile Met Asp Ala Leu Gln Gly Gln Val Ala Gly
        115                 120                 125

Met Gln Val
    130
```

<210> SEQ ID NO 3
<211> LENGTH: 350
<212> TYPE: PRT
<213> ORGANISM: Porphyromonas gingivalis

<400> SEQUENCE: 3

```
Met Lys Arg Met Thr Leu Phe Phe Leu Cys Leu Leu Thr Ser Ile Gly
1               5                   10                  15

Trp Ala Met Ala Gln Asn Arg Thr Val Lys Gly Thr Val Ile Ser Ser
            20                  25                  30

Glu Asp Asn Glu Pro Leu Ile Gly Ala Asn Val Val Val Gly Asn
        35                  40                  45

Thr Thr Ile Gly Ala Ala Thr Asp Leu Asp Gly Asn Phe Thr Leu Ser
    50                  55                  60

Val Pro Ala Asn Ala Lys Met Leu Arg Val Ser Tyr Ser Gly Met Thr
65                  70                  75                  80

Thr Lys Glu Val Ala Ile Ala Asn Val Met Lys Ile Val Leu Asp Pro
                85                  90                  95

Asp Ser Lys Val Leu Glu Gln Val Val Val Leu Gly Tyr Gly Thr Gly
            100                 105                 110

Gln Lys Leu Ser Thr Val Ser Gly Ser Val Ala Lys Val Ser Ser Glu
        115                 120                 125

Lys Leu Ala Glu Lys Pro Val Ala Asn Ile Met Asp Ala Leu Gln Gly
    130                 135                 140

Gln Val Ala Gly Met Gln Val Met Thr Thr Ser Gly Asp Pro Thr Ala
```

```
                145                 150                 155                 160
Val Ala Ser Val Glu Ile His Gly Thr Gly Ser Leu Gly Ala Ser Ser
                165                 170                 175

Ala Pro Leu Tyr Ile Val Asp Gly Met Gln Thr Ser Leu Asp Val Val
                180                 185                 190

Ala Thr Met Asn Pro Asn Asp Phe Glu Ser Met Ser Val Leu Lys Asp
                195                 200                 205

Ala Ser Ala Thr Ser Ile Tyr Gly Ala Arg Ala Ala Asn Gly Val Val
                210                 215                 220

Phe Ile Gln Thr Lys Lys Gly Lys Met Ser Glu Arg Gly Arg Ile Thr
225                 230                 235                 240

Phe Asn Ala Ser Tyr Gly Ile Ser Gln Ile Leu Asn Thr Lys Pro Leu
                245                 250                 255

Asp Asn Met Met Thr Gly Asp Glu Leu Leu Asp Phe Gln Val Lys Ala
                260                 265                 270

Gly Phe Trp Gly Asn Asn Gln Thr Val Gln Lys Val Lys Asp Met Ile
                275                 280                 285

Leu Ala Gly Ala Glu Asp Leu Tyr Gly Asn Tyr Asp Ser Leu Lys Asp
                290                 295                 300

Glu Tyr Gly Lys Thr Leu Phe Pro Val Asp Phe Asn His Asp Ala Asp
305                 310                 315                 320

Trp Leu Lys Ala Leu Phe Lys Thr Ala Pro Thr Ser Gln Gly Asp Ile
                325                 330                 335

Ser Phe Ser Gly Gly Ser Gln Gly Thr Ser Tyr Tyr Ala Ser
                340                 345                 350

<210> SEQ ID NO 4
<211> LENGTH: 408
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 4
catatgcaga accgtaccgt taagggcacc gtgatcagca gcgaggacaa cgaaccgctg      60
attggtgcga acgtggttgt ggttggcaac accaccatcg gtgcggcgac cgacctggat     120
ggcaacttca ccctgagcgt tccggcgaac gcgaagatgc tgcgtgtgag ctacagcggt     180
atgaccacca agagggttgc gatcgcgaac gttatgaaga ttgtgctgga cccggatagc     240
aaagtgctgg aacaggtggt tgtgctgggt tatggcaccg tcaaaagct gagcaccgtt      300 agcggcagcg ttgcgaaagt gagcagcgag aagctggcgg aaaaaccggt ggcgaacatt     360
atggatgcgc tgcagggcca agttgcgggt atgcaagtgt gactcgag                 408

<210> SEQ ID NO 5
<211> LENGTH: 1112
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 5
tagtaggttg aggccgttga gcaccgccgc cgcaaggaat ggtgcatgca aggagatggc      60
gcccaacagt cccccggcca cggggcctgc caccataccc acgccgaaac aagcgctcat    120
gagcccgaag tggcgagccc gatcttcccc atcggtgatg tcggcgatat aggcgccagc    180
```

```
aaccgcacct gtggcgccgg tgatgccggc cacgatgcgt ccggcgtaga ggatcgagat        240
cgatctcgat cccgcgaaat taatacgact cactataggg gaattgtgag cggataacaa        300
ttcccctcta gaaataattt tgtttaactt taagaaggag atatacatat gcagaaccgt        360
accgttaagg gcaccgtgat cagcagcgag gacaacgaac cgctgattgg tgcgaacgtg        420
gttgtggttg gcaacaccac catcggtgcg gcgaccgacc tggatggcaa cttcaccctg        480
agcgttccgg cgaacgcgaa gatgctgcgt gtgagctaca gcggtatgac caccaaagag        540
gttgcgatcg cgaacgttat gaagattgtg ctggacccgg atagcaaagt gctggaacag        600
gtggttgtgc tgggttatgg caccggtcaa aagctgagca ccgttagcgg cagcgttgcg        660
aaagtgagca gcgagaagct ggcggaaaaa ccggtggcga acattatgga tgcgctgcag        720
ggccaagttg cgggtatgca agtgtgactc gagcaccacc accaccacca ctgagatccg        780
gctgctaaca aagcccgaaa ggaagctgag ttggctgctg ccaccgctga gcaataacta        840
gcataacccc ttggggcctc taaacgggtc ttgagggggtt ttttgctgaa aggaggaact        900
atatccggat tggcgaatgg gacgcgccct gtagcggcgc attaagcgcg gcgggtgtgg        960
tggttacgcg cagcgtgacc gctacacttg ccagcgccct agcgcccgct cctttcgctt       1020 tcttccctte ctttctcgcc acgttcgccg gctttccccg tcaagctcta aatcgggggc       1080
tccctttagg gttccgattt agtgctttac gg                                     1112
```

CRA4S1 GENE, ENCODED CRA4S1 PROTEIN, AND APPLICATION

CROSS-REFERENCE TO RELATED APPLICATIONS

This application is a 371 U.S. National Phase of PCT International Application No. PCT/US2019/124433 filed on Dec. 11, 2019, which claims benefit and priority to Chinese Application No. 201910699285.5, filed on Jul. 30, 2019 and Chinese Application No. 201911247060.2, filed on Dec. 6, 2019, the contents of each of the applications listed herein are incorporated by reference herein in their entireties.

SEQUENCE LISTING

The instant application contains a Sequence Listing which has been submitted electronically in ASCII format and is hereby incorporated by reference in its entirety. Said ASCII copy, created on Nov. 19, 2021, is named 942601-001U1_SL.txt and is 7,672 bytes in size.

TECHNICAL FIELD

The invention relates to the field of bio-pharmaceuticals, in particular to the cra4s1 gene and its encoded protein and applications thereof.

BACKGROUND OF THE INVENTION

Periodontal disease is one of the most common oral diseases in the world. 80-97% of adults in China have periodontal problems in varying degrees. Periodontal disease is an independent risk factor for coronary heart disease and its acute onset and also for stroke. In addition, it has been found that *Porphyromonas gingivalis* (hereinafter referred to as *P. gingivalis*), the pathogenic bacterium of periodontal disease, is directly related to Alzheimer's disease (commonly known as senile dementia). Additionally, periodontal disease is a complication of diabetes, and closely linked to gastrointestinal and respiratory diseases, as well as women's giving birth to premature and low-weight new born babies. Thus, at present, it has been found to be an important cause of many diseases with high mortality. It is listed by the World Health Organization as the third largest non-communicable disease after cardiovascular disease and cancer.

The development of periodontal disease is divided into different stages. It is characterized by easy recurrence and progressive development of local lesions. At present, the treatment of periodontal disease relies on local lesion clearance, antibiotics and surgery, but these methods may reduce symptoms, but they cannot eliminate the root cause of infection.

The wide distribution of periodontal disease in the population and the linkage between periodontal disease and systemic diseases have fascinated scientists to explore vaccine research, use immunological methods to mobilize the body's immune function, inhibit and eliminate pathogens, prevent and treat periodontal disease/peri-implant inflammation and prevent recurrence.

*P. gingivalis* is one of the most widely studied and well-documented pathogens of adult periodontal disease. The candidate vaccines of *P. gingivalis*, including capsular polysaccharide, fimbriae, lipoid, outer membrane protein, heat shock protein, protease, inactivated whole bacteria and so on, are all in the scope of current research and development. However, the molecular structure, virulence factor, DNA sequence and toxicity of different subtypes of *P. gingivalis* are different, and the distribution rule of different subtypes of *P. gingivalis* in the population has not been found. Effective vaccine must be able to induce the body to produce long-term immunity to a certain microbial antigen, prevent the re-invasion of pathogenic bacteria, and reduce the harm to human body. The production of vaccine/antibody products against different subtypes of pathogenic bacteria should produce stable prevention and treatment effect, which impose a difficulty in commercial development. As a result currently, there are no relevant products on the market.

SUMMARY OF THE INVENTION

Purpose of invention: the purpose of the invention is to develop safe, stable and effective biological products to prevent and treat diseases caused by chronic infection of *P. gingivalis*, including but not limited to periodontitis/peri-implant inflammation. The key technology solved by the invention is to provide the cra4S1 gene and the Cra4S1 protein encoded by the cra4S1 gene.

The invention also solves the technical problem of providing an expression cassette, a recombinant vector or a cell, which contains the cra4S1 gene or a gene fragment thereof.

The technical problem to be solved in the invention is to provide the cra4S1 gene, the Cra4S1 protein, an expression cassette, a recombinant vector or a cell to produce products of vaccine or medicine to prevent or treat periodontitis or peri-implant inflammation or other infection caused by *P. gingivalis*.

The technical problem to be solved by the invention is to provide a vaccine or medicine, which contains the Cra4S1 protein or a fragment thereof.

The technical problem to be solved in the invention is to provide a specific antibody, which is raised by animals immunized with Cra4S1 protein or a fragment thereof.

The invention uses combined vaccine and/or specific antibodies specific to two targets, to prevent and treat periodontitis/peri-implant inflammation and other related diseases caused by chronic infection of *P. gingivalis*.

Technical scheme: to solve technical problems described above, the technical solution of the invention is to provide a novel cra4S1 gene, and the nucleotide sequence of the cra4S1 gene is shown in SEQ ID NO. 1.

The invention also includes the method for the cra4S1 gene discovery.

The invention also includes the Cra4S1 protein encoded by the cra4S1 gene, the amino acid sequence of which is shown in SEQ ID NO.2.

The invention also includes an expression cassette, a recombinant vector or a cell, which contains cra4S1 gene.

The invention also includes the cra4s1 gene, the design of an artificial synthetic gene, the protein, an expression cassette, a recombinant vector or a cell, their application for making product of vaccine or medicine in prevention and treatment to periodontitis or peri-implant inflammation or diseases associated with *P. gingivalis* infection.

The invention also includes a vaccine or medicine containing the Cra4S1 protein or a fragment thereof.

The vaccine or medicine also includes one or more of W50ragB protein, ThairagB protein, QMLragB protein and 381ragB protein of *P. gingivalis*.

The vaccine formula of the invention is as follows: the mass ratio of Cra4S1 protein to W50ragB protein in the vaccine is 1:2-8; or the mass ratio of Cra4S1 protein to ThairagB protein is 1:1-6; or the mass ratio of Cra4S1 protein to QMLragB protein is 1:1-6; or the mass ratio of Cra4S1 protein to 381ragB protein is 1:2-9; or the mass ratio of Cra4S1 protein to W50ragB protein, ThairagB protein, QMLragB protein and 381ragB protein is optimized according to the above mass ratio.

As preferred, the formula of the combined vaccine is Cra4S1 protein, W50ragB protein, QMLragB protein, with a mass ratio of 1:1:1.

The vaccine or medicine of the invention includes but is not limited to preventing and treating the occurrence or recurrence of periodontitis or peri-implant inflammation for healthy population and patients, but also to the other diseases related to infection of P. gingivalis.

Further, as preferred, the P. gingivalis includes subtypes of P. gingivalis W50, P. gingivalis Thai, P. gingivalis QML and P. gingivalis 381.

The invention also includes a specific antibody, which is raised by animals immunized with Cra4S1 protein or a fragment thereof.

The combination application of the specific antibodies was raised by animals immunized with one or more W50ragB protein, ThairagB protein, QMLragB protein and 381ragB protein of P. gingivalis.

The doses of Cra4S1 protein, W50ragB protein, ThairagB protein, QMLragB protein and 381ragB protein are all in the range of 0.5-50 µg.

As preferred, the doses of Cra4S1 protein, W50ragB protein, ThairagB protein, QMLragB protein and 381ragB protein are all 0.5-5 µg.

As preferred, the doses of Cra4S1 protein, W50ragB protein, ThairagB protein, QMLragB protein and 381ragB protein are all 5-50 µg.

Doses of poly-clonal antibody raised by immunization were 100-200 µg.

The specific antibody of the invention includes but is not limited to preventing and treating the occurrence or recurrence of periodontitis or peri-implant inflammation, for healthy population and patients, but also to the other diseases related to infection of P. gingivalis.

The core technology of the invention is to successfully solve the technical bottleneck of gene expression difficulties firstly, and then bases on the characteristics of molecular coordination and interdependence among the co-transcription genes, to successfully manufacture vaccines and antibody products for the prevention and treatment of periodontal disease/peri-implant inflammation.

BRIEF DESCRIPTION OF THE DRAWINGS

FIG. 3A shows recombinant plasmid cra4S1-pet-30a (+) in lane 1, and enzyme digestion reaction in lane 2, and 1 Kb DNA ladder (Genescript) in lane M. There are plasmid DNA and cra4S1 gene bands. FIG. 3B shows comparison of 1 Kb DNA ladder and DL3000 molecular weight scale (Genescript).

FIG. 4 shows that the amino acid sequence of the cloned target gene is consistent with the theoretical amino acid sequence of bacteria P. gingivalis. Figure discloses SEQ ID NOS 2, 2 and 2, respectively, in order of appearance.

FIG. 8A: lesion display; FIG. 8B: the lesion area is circled with a white line, and calculate with ImageJ, the detail of which is described in Example 4.

FIG. 9A: Investigation of virulence among subtypes of P. gingivalis strain as attack bacteria, the abscissa being the different P. gingivalis subtypes with different concentration at the time of challenge, and the ordinate being the areas of skin and soft tissue lesions in square millimetre $mm^2$. FIG. 9B: The doses are positively correlated with the lesion area, the abscissa being the different subtypes of P. gingivalis, and the ordinate being the area of skin and soft tissue lesions ($mm^2$). The doses are arranged in order. The larger the attack dose is, the larger the lesion area is.

FIG. 11A shows local lesions, comparison of the areas of soft tissue damage between the first infection and repeated infections, the abscissa being the days after the attack, the ordinate being the area of skin and soft tissue damage mm2. FIG. 11 B presents a screenshot from a video recorded on the 24th day of a recovery time period from repeatedly infected animals (group G148). FIG. 11 C shows a screenshot from a video recorded on the 24th day of a recovery time period from one of infected animals (group g148.1).

Cra4S1, G156 immunized with monovalent vaccine Cra4S1, G1547 was as pre-infected animal control, G158 was a primary infection control.

Figure 15B:
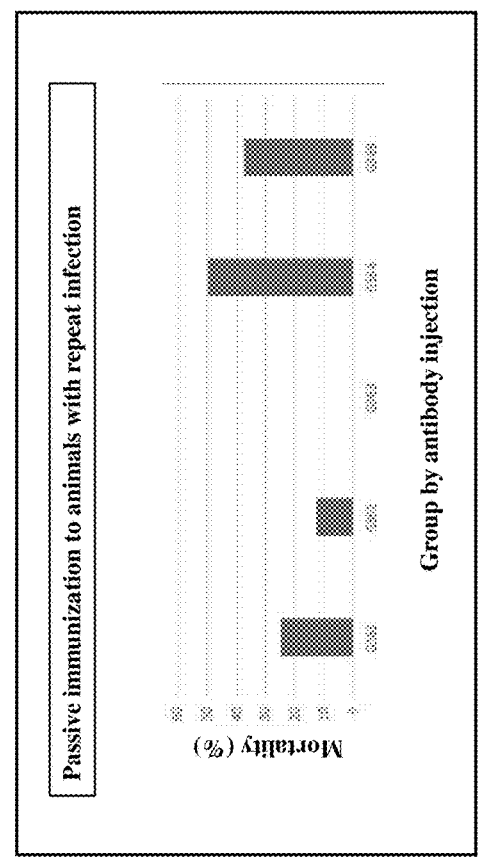
Figure 15A:
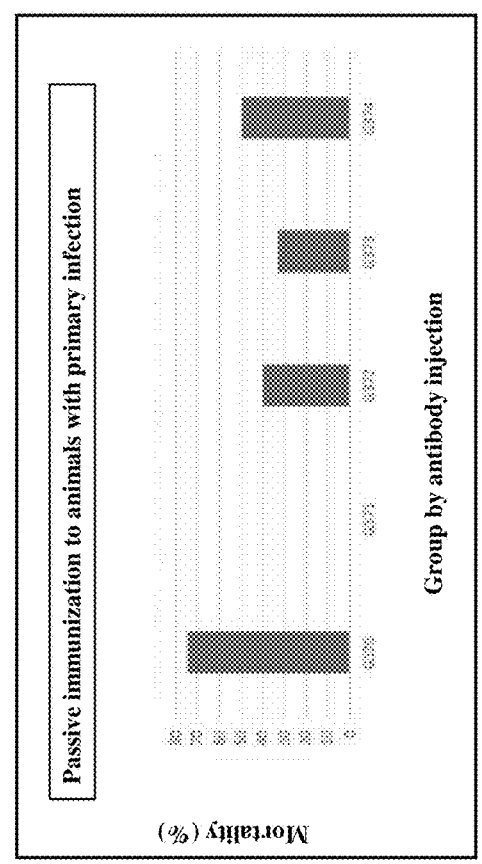

FIGS. 15A and 15B show the study on passive immune function of combination of two targeted specific antibodies, the details of which are described in Example 10. FIG. 15 A: G370, G371, G372, G373 and G374 had no pre-infection by P. gingivalis, and the animal mortality of post bacterial challenge was investigated. The antibodies were injected as follows: G370 injected with anti-ThairagB serum, G371 injected with combined antibody anti-ThairagB and anti-Cra4S1 serum, G372 injected with anti-Cra4S1 serum, G373 injected with normal mouse serum, G374 injected with PBS as a control. FIG. 15 B: G361, G362, G363, G364 and G369 groups had pre-infection history, and the animal mortality of post bacterial challenge was investigated. The antibodies were injected as follows: G361 injected with anti-ThairagB serum, G362 injected with combined antibody anti-ThairagB and anti-Cra4S1 serum, G363 injected with anti-Cra4S1 serum, G364 injected with normal mouse serum, G369 injected with PBS as a control.

Figure 16B:
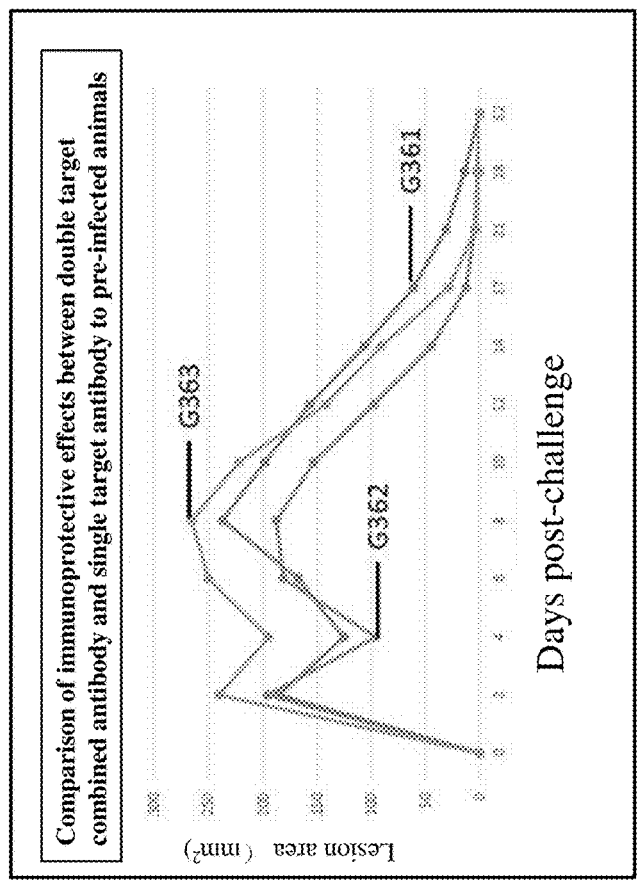
Figure 16A:
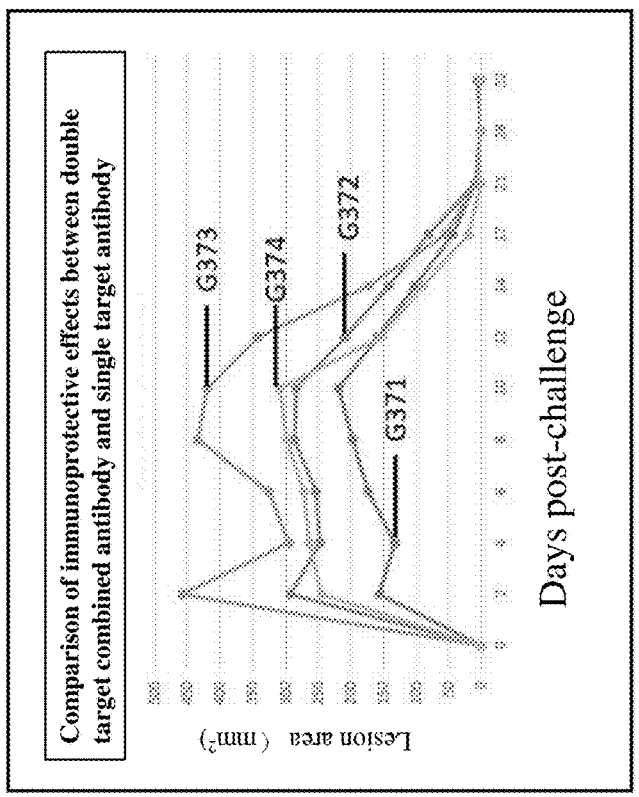

FIGS. 16A and 16B show the local immune protection of antibodies against two targets on animals with and without bacterial infection, FIG. 16A: G371, G372, G373 and G374 were normal animals that were not infected by P. gingivalis, the usage of antibody is the same as described in FIG. 15, the abscissa being the days post-challenge, the ordinate being the area of skin and soft tissue lesions (mm²); FIG. 16B: the mice in G361, G362, G363, G364 and G369 had a pre-infection history, the usage of antibody is the same as described in FIG. 15, the abscissa being the days post-challenge, the ordinate being the area of skin and soft tissue lesions (mm²).

DETAILED DESCRIPTION OF THE INVENTION

Principle and Method of the Invention

Figure 1:
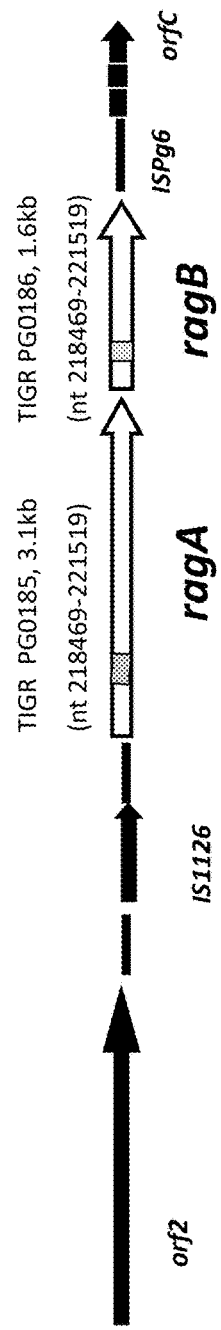
FIG. 1 shows P. gingivalis W50 major outer membrane protein receptor antigen gene (rag) locus.

The rag locus of P. gingivalis, which is composed of ragA and ragB genes with irregular insertion sequence at the both ends (FIG. 1). The open reading frames of ragA and ragB genes are independent, but there is a co-transcription relationship between them according to experimental studies. For example, when ragA gene is artificially mutated, RagB protein cannot be normally expressed, or when the downstream ragB gene is artificially mutated, RagA protein cannot be normally expressed in bacteria (PCT/GB2005/001976 is incorporated here for reference).

Utilizing the patented technology obtained by the company (PCT/GB2005/001976 is incorporated here for reference), through sequence analysis of ragB gene encoding bacterial outer membrane protein, four different subtypes of pathogens were predominantly detected in clinical samples. The outer membrane proteins corresponding to the four different subtypes of P. gingivalis were named W50ragB protein, ThairagB protein, QMLragB protein and 381ragB protein, respectively. The laboratory has completed the pilot production process of recombinant subunit monovalent and multivalent vaccines.

In fact, ragA gene has also a high degree of genetic polymorphism, but there is no published literature about the coding protein corresponding to the DNA polymorphism of ragA gene. The applicant attempted to clone and express ragA gene from genomic DNA by conventional methods, but with no success. On the basis of PCT/GB2005/001976 patent technology, the applicant found that there was a conserved amino acid sequence fragment in the protein encoded by ragA gene through protein sequence comparison analysis, but the cloning and, expression of, this conserved sequence fragment, by conventional methods were not successful.

In order to obtain the expression of RagA conserved region protein molecules, the applicant designed a new artificial synthesis of nucleotide sequence by codon optimization, the sequence was named cra4S1 (SEQ ID No 1), which means that there is a conservative amino acid sequence in the RagA protein of P. gingivalis, and that the four major bacterial subtypes all have this common protein sequence.

In the invention, the cra4S1 gene was successfully cloned into the expression vector, and the recombinant protein is generated under the induction condition. The purified recombinant protein (Example 3, FIGS. 2, 3A&313, 5, 6 and 7) was obtained using chromatography and molecular sieve principle. The recombinant Cra4S1 protein, with a molecular weight of about 15 kDa, recombinant constructed vector DNA was sequenced in accordance with the design scheme, the encoded protein sequence was consistent with the theoretical sequence of conserved region (FIG. 4), and the molecular weight meets the expected theoretical value.

The recombinant Cra4S1 protein shows strong antigenicity. Animals immunized with low doses can produce high titers of antibodies (Example 8 for details). However, animals immunized with only cra4s1 protein do not show immune protection.

It was observed that the antibodies raised by Cra4S1 protein were not reacting with P. gingivalis or bacterial lysates in vitro. It was also shown that there was no obvious immunological reaction to recombinant Cra4S1 protein in neither RagB antiserum nor whole bacteria antiserum. These results suggest that Cra4S1 protein seemed not the major antigen on the surface of the bacteria.

Interestingly, if animals were challenged with P. gingivalis after being vaccinated with RagB protein, their serum antibodies show immune cross reaction with the recombinant Cra4S1 protein in different degrees. This phenomenon shows that when RagB antibody binds to the outer membrane protein RagB of P. gingivalis, the original spatial structure of Cra4S1 protein is changed, and the hidden antigenicity is exposed.

Figure 12:
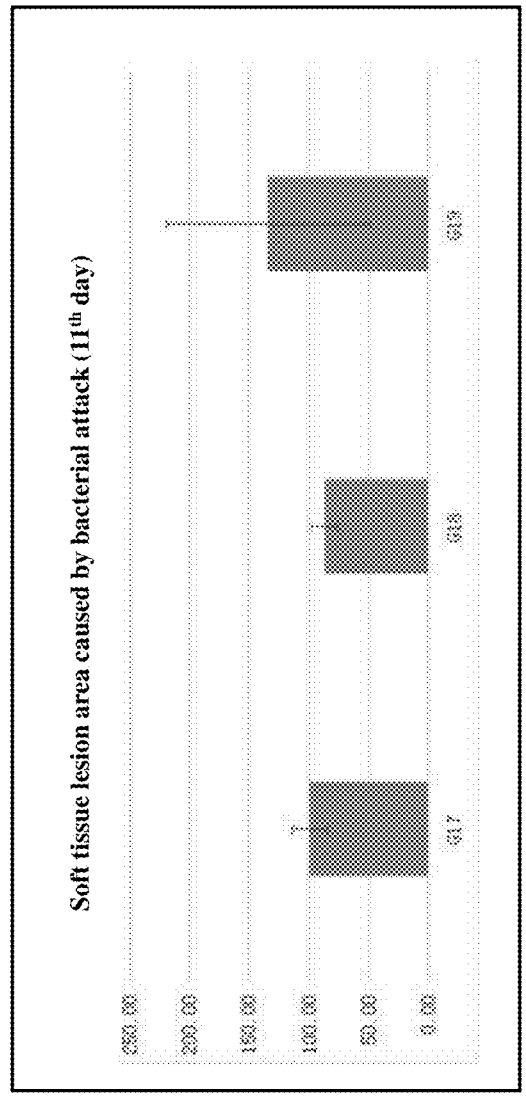
FIG. 12 shows an immune protective function of combined vaccine, the details of which are described in Example 8, the abscissa being the days after challenge, and the ordinate being the area of skin and soft tissue lesions ($mm^2$).

In an experiment, when recombinant protein Cra4S1 and RagB were mixed together, unexpected results are observed, and the new formula enhances the immune protection against P. gingivalis challenge (Example 8, FIG. 12). This phenomenon reveals that when the antibodies bind to RagB antigen on the bacteria surface, the spatial structure of the Rag protein changes, exposing Cra4S1 protein and let it recognized by the antibody. Thus, the double targets on the surface of the bacteria are captured by specific antibodies at the same time, which limits the function of main outer membrane proteins, so as to achieve the effect of inhibiting and eliminating the bacteria.

The new vaccine formula also shows the improvement on product performance stability, which is reflected in the low level of data standard deviation. Said data standard deviation is an indicator for measuring the dispersion of the average value of a group of data. A smaller standard deviation represents that the group of data are closer to the average value, indicating a reduced risk of accidental dispersion. This phenomenon further proves that the immune effect of antibody and antigen double target reaction corresponding to RagA and RagB is more stable.

The innovation of the invention is to use the multi-target characteristics of bacterial surface antigen to prepare stable and efficient biological products.

Another innovation of the invention is that the mixed vaccine is not only beneficial to healthy mice, but also applied to animals pre-infected with *P. gingivalis*. The experimental results show that the mixed vaccine has significant immune protective effect on infected animals (Example 9). Periodontal disease/peri-implant inflammation caused by *P. gingivalis* infection is a chronic, intermittent and progressive process. It was observed in animal experiments that after multiple infections, not only the local pathological conditions became more serious, but also the general condition of animals showed weakness (Example 7). Clinically, there are many people suffering from periodontal disease. Therefore, if the invention can control chronic infection, it will prevent the harm of chronic infection to general health, and the product is expected to have broad market prospects.

In addition to the improvement of the immune efficacy and stability by the mixed vaccine, the passive immune experiment also verified that the combined antibody contains the antibodies against Cra4S1 protein and RagB protein, and thei immune protection is stronger than that of the experimental group using a single antibody, respectively (Example 10).

Both mixed vaccine and combined antibody and their protection on active and passive immunity on pre-infected animals are also included in this manual.

Beneficial effect: compared with the prior art, the invention has the following advantages:
1. The invention discloses the cra4S1 gene related to *P. gingivalis* for the first time and cloned and successfully expressed the Cra4S1 protein in *E. coli* for the first time. The combined vaccine and combined antibody of the invention have significant immune protection in pre-infection animals, indicating that the invention has broad application prospects and can be used for both healthy people and patients with chronic infection.
2. The vaccine of the invention contains the target of *P. gingivalis* specific outer membrane protein and the newly discovered conserved region antigen component, which is immune efficacy than the vaccine prepared using the outer membrane protein alone or the newly discovered antigen alone. The combined application of the antibody, produced by animals immunized with the conserved region antigen, and outer membrane protein of *P. gingivalis*, significantly improved the immune protective effect of the antibody. In addition, the product of the invention including combinational vaccine and mixed antibody against separate two targets show that the standard deviation of the experimental data is kept at a low level in animal experiment, suggesting that the product of the invention can provide better stability in vivo experiments.
3. The invention points out that with respect to the anti-infective immunity, when specific antibody reacts to the interrelated targets on bacterial surface to conservative region antigen and bacterial subtype specific antigen, they can stably and effectively give full play to the effect of the antibody, inhibit and eliminate the pathogenic bacteria, and achieve the purpose of both preventing and treating diseases.

Further examples of the invention will be described below, including foreground predictions, but they are not limited to the invention.

The invention is further described below in combination with the accompanying drawings.

Example 1 cra4S1 Gene Nucleotide Sequence Design

Zhenjiang Yangtze Green Biotechnology provided DNA sequence and design requirements, and Nanjing Genscript Biotech Corporation ("GenScript") provided nucleotide synthesis services.

The idea of creating cra4S1 gene was derived from ragA gene of *P. gingivalis*. The rag locus is composed of ragA (encoding outer membrane protein, molecular weight about 115 kda) and ragB (encoding outer membrane protein immune source region, molecular weight about 55 kDa protein), and ragA and ragB are co-transcribed (FIG. 1). The inventor's previous invention patents and published literatures have disclosed that ragA and ragB genes have the characteristics of genetic polymorphism. However, the research on ragA gene and its coding protein has not been reported publicly.

The applicant's research results show that there is a relatively conservative stable region sequence in the protein encoded by ragA gene. In the following RagA sequence, the underlined part is the common amino acid sequence of four major *P. gingivalis* subtypes.

W50ragA2334-5387
(SEQ ID NO: 3)
MKRMTLFFLC LLTSIGWAMA QNRTVKGTVI

SSEDNEPLIG ANVVVVGNTT IGAATDLDGN

FTLSVPANAK MLRVSYSGMT TKEVAIANVM

KIVLDPDSKV LEQVVVLGYGTGQKLSTVSGS

VAKVSSEKL AEKPVANIMD ALQGQVAGMQ

VMTTSGDPTA VASVEIHGTG SLGASSAPLY

IVDGMQTSLD VVATMNPNDF ESMSVLKDAS

ATSIYGARAA NGVVFIQTKK GKMSERGRIT

FNASYGISQI LNTKPLDNMMTGDELLDFQVK

AGFWGNNQTVQKVKDMILAGAEDLYGNYDSLK

DEYGKTL FPVDFNHDAD WLKALFKTAP

TSQGDISFSG GSQGTSYYAS.

Different subtypes of the same bacteria have the same protein sequence, which indicates the prospect of broad-spectrum vaccine protection against the bacteria, but the attempt to extract target gene fragments from bacterial genomic DNA by conventional methods has not been successful.

The present invention modifies the nucleotide sequence by using the codon preference of the host itself. After the nucleotide sequence is improved, the encoded protein sequence must be consistent with the target gene to achieve the goal of accurate expression of the target protein. The synthetic gene sequence is named cra4S1, which means that there is a stable and conservative amino acid sequence in the ragA gene of *P. gingivalis* and the four major bacterial subtypes all have this common protein sequence. In the invention, all intellectual property rights of the artificially designed nucleotide sequence obtained by the gene synthesis method exclusively owned by Zhenjiang Yangtze Green Biotechnology, and GenScript provides only the nucleotide synthesis service.

The nucleotide sequence of the synthesized cra4S1 gene is as follows

```
                                         (SEQ ID NO: 4)
CATATGCAGAACCGTACCGTTAAGGGCACCGTG

ATCAGCAGCGAGGACAACGAACCGCTGATTGGT

GCGAACGTGGTTGTGGTTGGCAACACCACCATC

GGTGCGGCGACCGACCTGGATGGCAACTTCACC

CTGAGCGTTCCGGCGAACGCGAAGATGCTGCGT

GTGAGCTACAGCGGTATGACCACCAAAGAGGTT

GCGATCGCGAACGTTATGAAGATTGTGCTGGAC

CCGGATAGCAAAGTGCTGGAACAGGTGGTTGTG

CTGGGTTATGGCACCGGTCAAAAGCTGAGCACC

GTTAGCGGCAGCGTTGCGAAAGTGAGCAGCGAG

AAGCTGGCGGAAAAACCGGTGGCGAACATTATG

GATGCGCTGCAGGGCAAGTTGCGGGTATGCAA

GTGTGACTCGAG.
```

The fragment length of cra4S1 gene is 408 bp, including 393 bp target gene. NdeI (underlined CATATG) was designed for 5' end restriction endonuclease, the starting code is ATG in restriction endonuclease, and XhoI (underlined CTCGAG) was designed for 3' end restriction endonuclease. When the translation of the target gene is completed, the TGA (bold type) termination codon is specially set to terminate the translation immediately to ensure the correct expression of the target gene. The accuracy of the synthetic target gene needs to be tested after the plasmid DNA is transformed into the host cell.

Example 2

Construction and Identification of cra4S1 Gene Expression Vector

Figure 2:
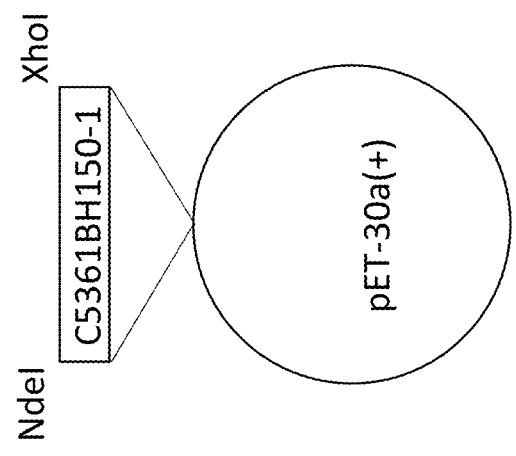
FIG. 2 shows construction of recombinant plasmid vector in which: C5361BH150-1 is the target gene cra4S1.

Construction method of prokaryotic expression vector containing Cra4S1 protein open reading frame: ligation of the synthetic cra4S1 gene fragment of Example 1 to the vector plasmid pET-30a (+) (purchased from Genscript), and the construction of the recombinant plasmid is shown in FIG. 2. The restriction endonuclease NdeI and XhoI were designed to cut the plasmid and target gene. The restriction endonuclease reaction solution is as follow: 2 μl for each restriction endonuclease, 4 μl of 10× buffer, 1 μg of pet-30a (+) and cra4S1 each, ddH2O was used to supplement 40 μl, incubate the reaction solution in a water bath at 37° C. for 2 hours. DNA fragments were extracted and purified from electrophoresis agarose gel, and then, vectors and target genes were ligated. The ligation system was: 200 ng vector, 280 ng cra4S1 gene fragment, T4 DNA ligase 1 μl, 10× buffer 2 μl, add ddH2O to supplement to 20 μl, incubated at 16° C. 12~16 h. The expression vector cra4s1-pet-30a (+) was then transformed into E. coli.

Figure 3B:
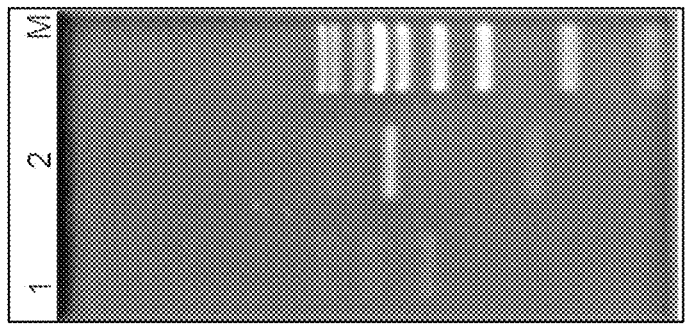
FIGS. 3A-3B show identification of recombinant plasmid by enzyme digestion.
Figure 3A:
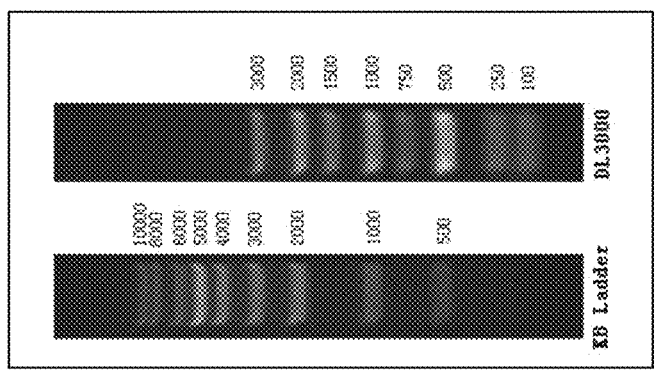

Transformation: 1 μl (100 ng) of cra4s1-pet-30a (+) plasmid add to 100 μl competent E. coli BL21 (DE3) plyss (purchased from Genscript), place in ice bath for 20 minutes; heat shock at 42° C. for 90 seconds, quickly place in ice for 5 minutes, and add 600 μl LB culture medium; shake at 37° C. and 220 rpm for 1 hour. After centrifugation, the culture was spread on LB plate with 50 μg/ml kanamycin at 37° C. overnight. A single colony was randomly selected on the LB plate with transformed bacteria. After plasmid DNA was extracted and purified, enzyme digestion test was used to confirm that the plasmid contains the gene fragment (FIG. 3), plasmid DNA was sent for sequencing.

The sequencing results are as follows:

```
                                         (SEQ ID NO: 5)
TAGTAGGTTGAGGCCGTTGAGCACCGCCGCCGCA

AGGAATGGTGCATGCAAGGAGATGGCGCCCAAC

AGTCCCCCGGCCACGGGCCTGCCACCATACCC

ACGCCGAAACAAGCGCTCATGAGCCCGAAGTGG

CGAGCCCGATCTTCCCCATCGGTGATGTCGGCG

ATATAGGCGCCAGCAACCGCACCTGTGGCGCCG

GTGATGCCGGCCACGATGCGTCCGGCGTAGAGG

ATCGAGATCGATCTCGATCCCGCGAAATTAATA

CGACTCACTATAGGGGAATTGTGAGCGGATAAC

AATTCCCCTCTAGAAATAATTTTGTTTAACTTT

AAGAAGGAGATATACATATGCAGAACCGTACCG

TTAAGGGCACCGTGATCAGCAGCGAGGACAACG

AACCGCTGATTGGTGCGAACGTGGTTGTGGTTG

GCAACACCACCATCGGTGCGGCGACCGACCTGG

ATGGCAACTTCACCCTGAGCGTTCCGGCGAACG

CGAAGATGCTGCGTGTGAGCTACAGCGGTATGA

CCACCAAAGAGGTTGCGATCGCGAACGTTATGA

AGATTGTGCTGGACCCGGATAGCAAAGTGCTGG

AACAGGTGGTTGTGCTGGGTTATGGCACCGGTC

AAAAGCTGAGCACCGTTAGCGGCAGCGTTGCGA

AAGTGAGCAGCGAGAAGCTGGCGGAAAAACCGG

TGGCGAACATTATGGATGCGCTGCAGGGCCAAG

TTGCGGGTATGCAAGTGTGACTCGAGCACCACC

ACCACCACCACTGAGATCCGGCTGCTAACAAAG

CCCGAAAGGAAGCTGAGTTGGCTGCTGCCACCG

CTGAGCAATAACTAGCATAACCCCTTGGGGCCT

CTAAACGGGTCTTGAGGGGTTTTTTGCTGAAAG

GAGGAACTATATCCGGATTGGCGAATGGGACGC

GCCCTGTAGCGGCGCATTAAGCGCGGCGGGTGT

GGTGGTTACGCGCAGCGTGACCGCTACACTTGC

CAGCGCCCTAGCGCCCGCTCCTTTCGCTTTCTT

CCCTTCCTTTCTCGCCACGTTCGCCGGCTTTCC

CCGTCAAGCTCTAAATCGGGGGCTCCCTTTAGG

GTTCCGATTTAGTGCTTTACGG.
```

The 393 bp bases in bold shown above are the cloned cra4s1 gene sequence, the underlined bases are the restriction endonuclease cut point, and the TGA stop codon is at the end; the 352-744 nucleotide sequence of the recombinant gene sequence is 100% identical with the designed nucleotide sequence.

The theoretical amino acid sequence is as follows:

Conservative RagA amino acid sequence (leading peptide 20AA removed):

```
                                          (SEQ ID NO: 2)
QNRTVKGTVI  SSEDNEPLIG  ANVVVVGNTT

IGAATDLDGN  FTLSVPANAK  MLRVSYSGMT

TKEVAIANVM  KIVLDPDSKV  LEQVVVLGYG

TGQKLSTVSG  SVAKVSSEKL  AEKPVANIMD

ALQGQVAGMQ  V.
```

Figure 4:
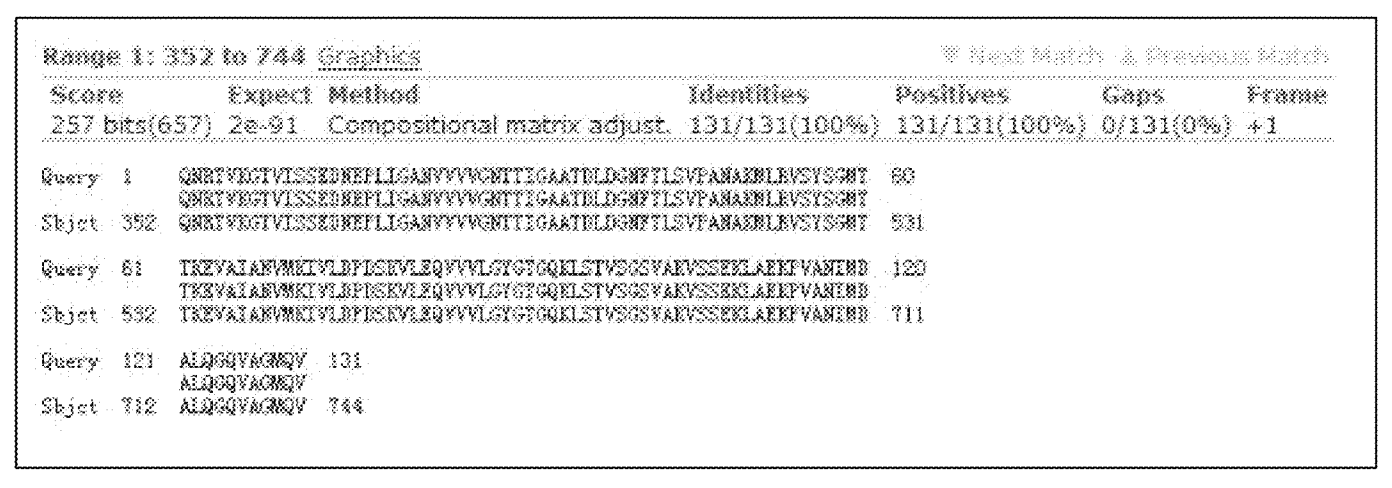

The amino acid sequence corresponding to the translated protein of the above SEQ ID No.1. is compared with the theoretical amino acid sequence, and the comparison results are shown in FIG. 4.

Results: the DNA sequence of the target gene in the recombinant plasmid was 100% consistent with the optimized design of cra4S1 gene pairing, and the expected protein sequence was 100% consistent with the target theoretical amino acid sequence.

Example 3

Induction, Expression and Purification of Cra4S1 Protein

IPTG induction: select two single colonies on the transformation plate of Example 2 and inoculate them in a tube containing 3 ml LB culture medium with 50 μg/ml kanamycin respectively, shake them overnight at 37° C., 200 rpm. Then inoculate 1 ml culture from the 3 ml LB culture in 100 ml LB culture medium containing 50 μg/ml kanamycin, shake at 220 rpm until OD reach to 0.6-0.8 (about 4 h) at 37° C. Afterward, take out 1 ml culture, centrifugation it at room temperature 10000 g 5 minutes. Following the centrifugation discard the supernatant and suspend the bacteria with 100 μl PBS for sedimentation. Add IPTG to the remaining culture making the final concentration 1 mM, shaking at 37° C. and 220 rpm for 4 hours to induce the expression of recombinant protein. Next take 1 ml of the culture, and centrifuge at room temperature of 10000 g for 5 minutes. After centrifugation, discard the supernatant, and suspend the bacteria with 100 μl PBS for sedimentation. After centrifugation and precipitation, supernatant were discarded, and cell pellets were weighed and recorded, and stored in −20° C. refrigerator.

Figure 5:
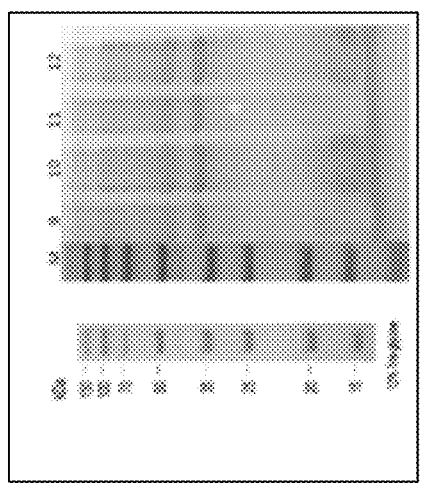
FIG. 5 shows the detection of recombinant protein expression after induction. Lane M: protein molecular weight scale (15-120 kDa); lane 9: total protein of bacteria before induction (colony 1); lane 10: total protein of bacteria after induction (colony 1); lane 11: total protein of bacteria before induction (colony 2); lane 12: total protein of bacteria after induction (colony 2).

Protein expression detection: take the bacterial suspension before and after induction in the previous step, add 2×SDS sample buffer of equal volume, mix and heat them at 100° C. for 5 minutes, and then SDS-PAGE electrophoresis and Coomassie Brilliant blue staining were conducted to detect the recombinant protein (FIG. 5). The results presented in FIG. 5 showed that the transformed bacteria produced the target protein under the induction of IPTG and showed strong protein bands at the molecular weight of 15 kDa, which was in line with the theoretical value of the target protein. Non-induced bacteria produce no such protein.

Figure 6:
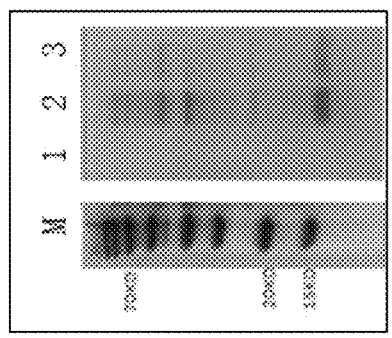
FIG. 6 shows the detection of recombinant protein expression after induction. Lane M: protein molecular weight scale (15-120 kDa); lane 1: centrifugal supernatant; lane 2: whole bacterial lysate; lane 3: bacterial lysate supernatant.

Purification of recombinant protein by affinity chromatography: firstly, the IPTG induced bacteria were broken by ultrasound, and 30 ml Tris HCl (PH8.0)/1 g of bacteria wet weight was added to the IPTG induced bacteria, evenly suspended, then centrifuge this suspension at 4° C. and 10000 rpm for 30 minutes. After cleaning the bacterial sediment three times, the bacteria were resuspended. The bacteria were broken by ultrasonic (Ningbo Xinzhi ultrasonic crusher Y-92III). A glass beaker containing the bacterial solution was placed in an ice bath. The ultrasonic time was 3 seconds, the interval time was 5 seconds, and the total ultrasonic working time was 8 minutes. After ultrasound, the culture then is centrifuged at 4° C. and 10000 rpm for 15 minutes, supernatant and sediment were collected on which SDS-PAGE was preformed (FIG. 6). The results presented in FIG. 6 showed that the recombinant protein mainly appeared in the supernatant after centrifugation, indicating that the recombinant protein was synthesized in the form of soluble in the cell, avoiding the subsequent refolding process of inclusion bodies.

Figure 7:
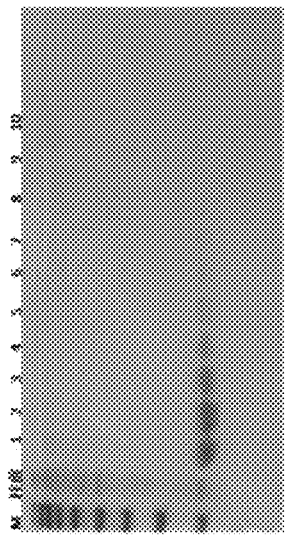
FIG. 7 shows collection of purified protein by affinity chromatography. Lane M: protein molecular weight scale (15-120 kDa); prior column: flow through; lane 1-10 is collected protein fluid.

The recombinant protein was purified by affinity chromatography with AKTA purifier (GE company), DEAE column was selected (Huiyuan). The supernatant solution of bacterial lysate containing the recombinant protein was added to the purification column. The volume of the sample could be 40 ml-100 ml (1-5 mg/ml) at one time, and the flow rate of sample was 1.5 ml/minute. The mobile phase solution A was 50 mM Tris HCl, PH8, when the OD280 value of the effluent reaches the baseline, and then mobile phase solution B was used, which is 50 mM Tris HCl company with 1M NaCl, PH8.0, elute the target protein with different gradient B solution, 10% B, 18% B, 100% B at the flow rate of 4 ml/minute. The effluent was collected and labeled. The purified protein was detected by SDS-PAGE electrophoresis. FIG. 7 shows the protein collected by the first step elution. The further purification was carried out with Phenyl Sepharose FF column. After removing impurities, stored the recombinant protein at −20° C.

Conclusion: the recombinant protein can be produced in the cells after IPTG induction of plasmid transformed bacteria, and it is found that the recombinant protein mainly exists in the supernatant of lysate, indicating that Cra4S1 exists in the form of soluble protein. The purified Cra4S1 protein was obtained by affinity chromatography. The molecular weight of the recombinant protein was about 15 kDa, which is in line with the expected theoretical value.

Example 4

Calculation Method of Lesion Area in Soft Tissue in Mouse Distraction Model

In order to detect the pathogenicity and virulence of *P. gingivalis*, a mouse model of epidermis and subcutaneous soft tissue lesions was established.

It is summarized as follows: *P. gingivalis*, including various subtypes (*P. gingivalis* W50, Thai, QML and 381), are all grown on the Fastidious Anaerobic Agar (FAA) plate containing 5% defibrinated horse blood and placed in an anaerobic incubator at 37° C., containing 80% nitrogen, 10% hydrogen and 10% carbon dioxide. The bacterial colonies were transferred to the freshly prepared BHI culture medium (Brain Heart extract culture medium) containing 5 μg/ml hemin, grown for 18-24 hours, until the OD600 nm reached 1-1.2, and then the culture was centrifuged and washed twice, and following the washing, make bacterial suspension at different concentrations (2-8×10$^{10}$ CFU/ml) using BHI culture medium for animal experiments (Balb/c, purchased from Yangzhou University Animal Centre). Mice were divided into groups according to different experimental plans. Those mice are generally 6-8 weeks old, 18-22 g in weight, 8-12 in each group. Each mouse was inoculated with 200 μl of bacterial suspension, subcutaneously injected on both sides of the vertebrae on the back. After the bacterial challenge, the weight changes, behaviours, and actions of the mice were recorded, and the lesions of skin and subcutaneous soft tissue were recorded.

Specifically, when using *P. gingivalis* W50 subtype to challenge Balb/c mice, prepare $3*10^{10}$ CFU/ml bacterial suspension, and inject 0.2 ml of the bacteria suspension into the subcutaneous on both sides of the back spine of mice.

Figure 8B:
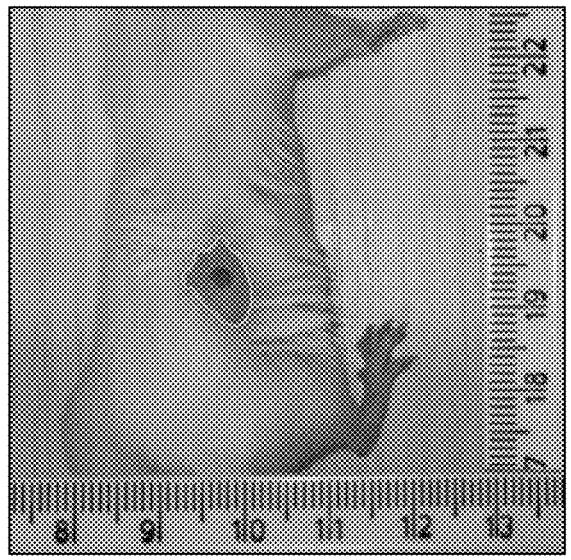
FIGS. 8A-8B show subcutaneous and skin soft tissue lesions in animal model mouse.
Figure 8A:
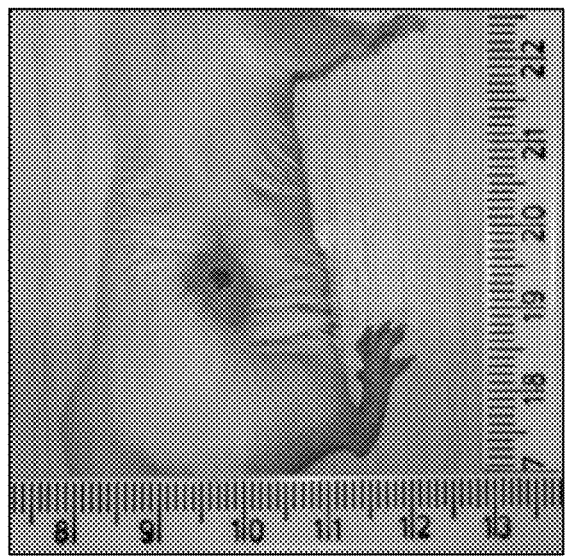

Results: FIG. 8 showed that animal skin and subcutaneous soft tissue distraction after bacteria challenge, and the white line circle marks the lesion area. It originally started with manually measuring the longest longitudinal diameter and the corresponding transverse diameter of the lesion, multiplied by the diameter to calculate the lesion area, and all handwritten data are stored. In April 2019, the method of identifying and calculating the lesion area was improved. A fixed camera was used to take pictures, the distance between the camera and the lesion area remained unchanged, and then the lesion area within the circle was calculated using image J (computer software name).

Summary: The model of soft tissue injury on the surface of the mouse used in this embodiment is to dynamically observe the local pathological changes, including the pathological characteristics of the wound, the progress of the course of the disease, the wound healing and the prognosis of the disease, and to comprehensively determine the harm caused by the infection of *P. gingivalis* in combination with the indicators such as the weight change, mental state and behaviour characteristics of the mouse. The photographing and computer software are used to locate and calculate the lesion area, to reduce human errors, to keep image records, and to trace and further study the original data. The animal experimental model used in this embodiment is recognized in the industry according to international general methods and standards.

Example 5

Correlation between Dose of *P. gingivalis* Infection and Soft Tissue Lesions in Mice The purpose of this embodiment is to investigate the subtypes of *P. gingivalis* corresponding to the four major outer membrane proteins, their virulence differences, and the correlation between the dose of bacterial infection and lesions.

Specifically, the four different subtypes of *P. gingivalis* include W50 subtype, Thai subtype, QML subtype and 381 subtype, referring to the method described in Example 4. Three bacterial suspensions with different concentrations were made, namely, $5\times10^9$ CFU/ml, $2\times10^{10}$ CFU/ml, and $8\times10^{10}$ CFU/ml, Balb/c. Mice. 6-8 weeks old, weight 18-24 g, 8-12 in each group, are used and each mouse was inoculated with 200 μl bacterial suspension subcutaneously on both sides of the vertebrae on the back of mice. After bacterial challenge, the body weight, behaviour, and local soft tissue lesions of the mice were recorded.

Figure 9B:
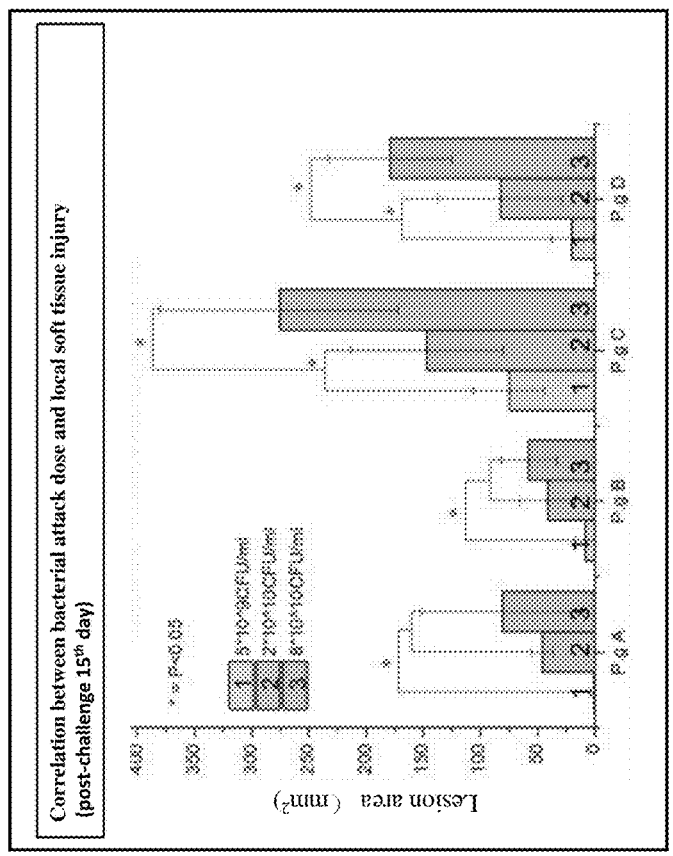
FIGS. 9A-9B show the correlation between bacterial attack doses and local soft tissue injury, the details of which are described in Example 5, the injury recorded here being 15 days post-challenge.
Figure 9A:
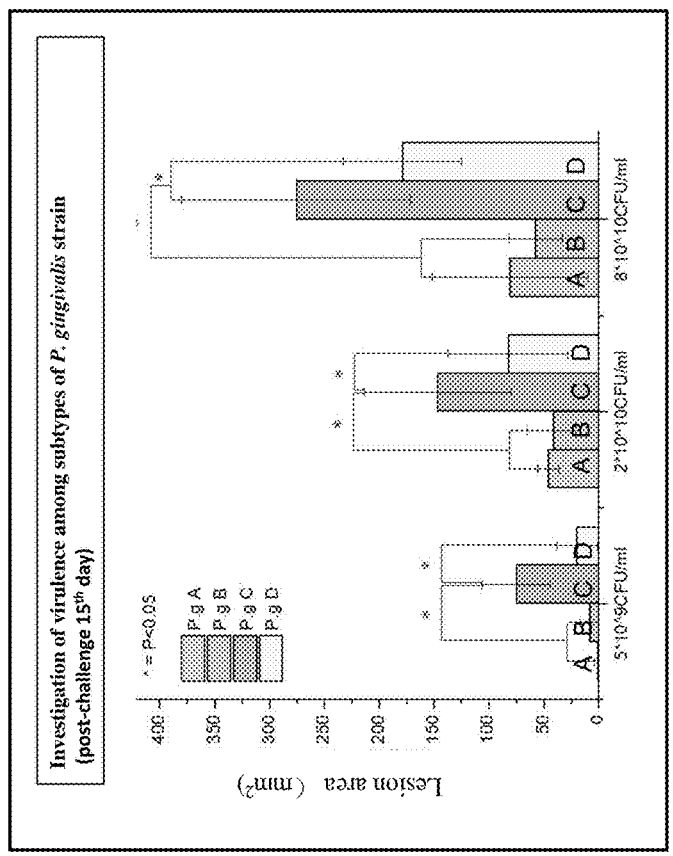

Results: With the increase in the concentration of the attacking bacteria, the systemic atrophy and local lesions of animals became more serious. The body weight loss caused by the invasion of high concentration bacteria was the most obvious, the mice were morbid, and the area of local pathological changes was the largest. When the four different *P. gingivalis* subtypes were challenged by the same dose of bacteria, the local damage is also inconsistent (FIG. 9A and FIG. 9B).

Conclusion: FIG. 9A and FIG. 9B show that the virulence of the four tested strains of *P. gingivalis* are different. In FIG. 9A, PgA, PgB, PgC and PgD represent the W50, Thai, QML and 381 subtypes of *P. gingivalis*, and in FIG. 9B the three bacterial suspensions 1, 2 and 3 represent $5\times10^9$ CFU/ml, $2\times10^{10}$ CFU/ml and $8\times10^{10}$ CFU/ml respectively. However, when 20 different strains of *P. gingivalis* (belonging to the four main subtypes of *P. gingivalis*) were tested in the same way in the challenge experiments, it was found that the virulence among strains was different even within the same subtype (data not shown). Therefore, the difference in virulence among strains in this embodiment did not have the representative characteristics of this subtype. That is, the results of this embodiment do not indicate what *P. gingivalis* subtype has the strongest or weakest virulence. However, the correlation between virulence and a dose was repeated for all four subtypes, and the greater the attack dose, the greater the harm. According to the clinical symptoms, bacteria will erupt rapidly when they gather to a certain concentration.

Example 6

Correlation between *P. gingivalis* Infection and the Age of Experimental Mice

In practice, it has been noticed that mice over 25 weeks old with no pre-infection of *P. gingivalis* have only slight local lesions when attacked by different subtypes of *P. gingivalis*. The purpose of this embodiment is to investigate the correlation between age and *P. gingivalis* infection.

Specifically, according to the method described in Example 4, a bacterial suspension of *P. gingivalis* W50 subtype $2*10^{10}$ CFU/ml was made, and 0.2 ml was injected into the subcutaneous tissues on both sides of the dorsal vertebrae of the experimental mice of each age group. There were 8-10 animals in each age group. After the bacterial attack, the development of the lesion area was observed until the end of the experiment on the 35th day.

Figure 10:
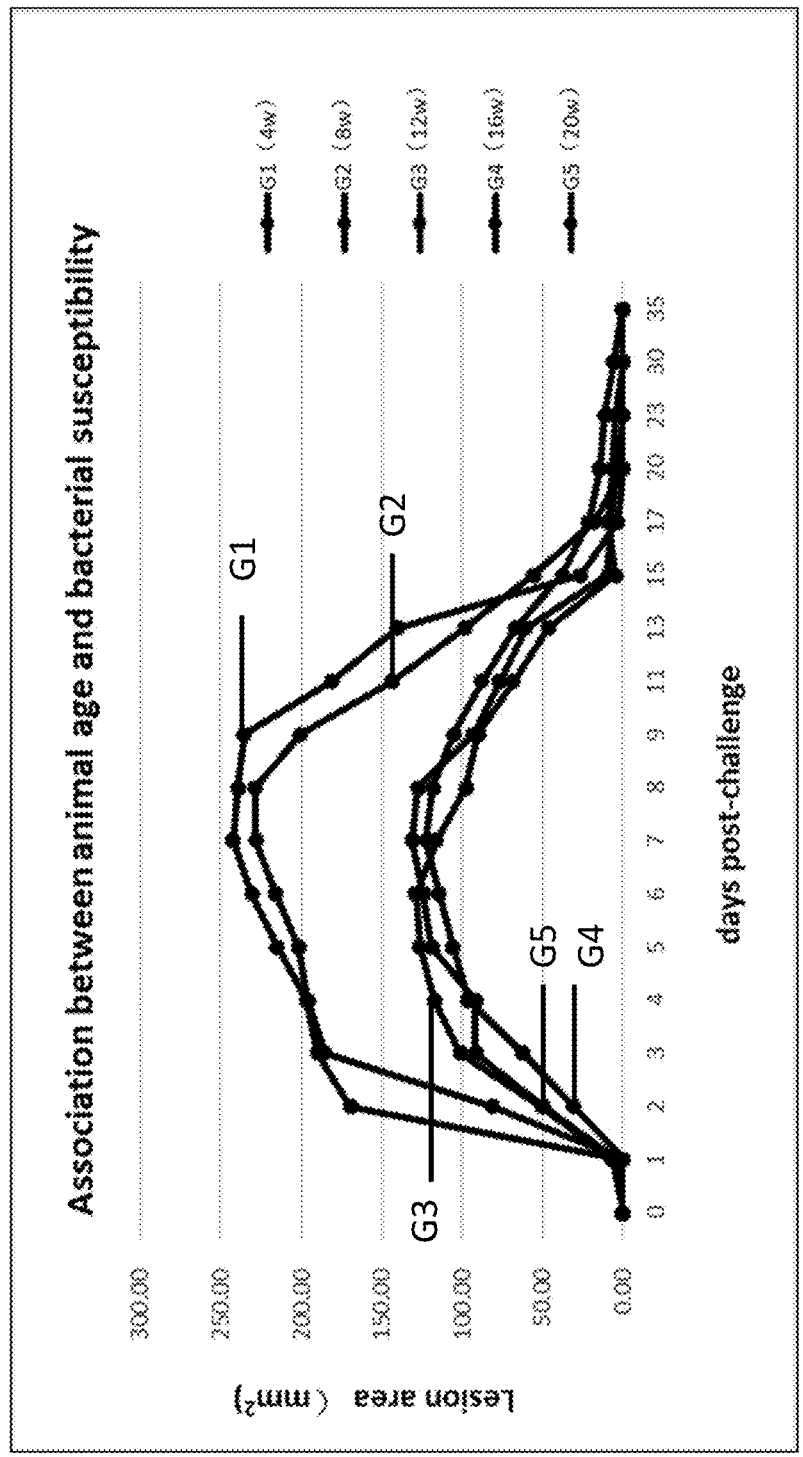
FIG. 10 shows association between animal ages and bacterial susceptibility, abscissa being time, days post-challenge, and ordinate being the areas of skin and soft tissue lesions ($mm^2$), details of which are described in Example 6. G1 (4 weeks old), G2 (8 weeks old), G3 (12 weeks old), G4 (16 weeks old) and G5 (20 weeks old) represent animals of different age groups, respectively.

Results: The same dose and volume of bacterial suspension were used to attack the mice of different age groups, and the results showed that the attack by the W50 subtype of *P. gingivalis* challenge causes various damage degrees, for the age range groups. In this experiment, animals of all age groups did not die after being attacked by bacteria. The animals in G1 group (weight 15-18 g) and G2 group (weight 22-26 g) were in their infancy at 4 and 8 weeks, respectively, showing rapid onset and serious pathological changes. However, the recovery of self-healing was fast, and the healing period was short. The pathological process of adult mice from 12 weeks (weight 28-32 g) of G3 group to 16 weeks (weight 32-36 g) of G4 group and to 20 weeks (weight 33-38 g) of G5 group was similar. The area of pathological damage was significantly lower than that of young group, but the prognosis of adult group was delayed (Table 1, FIG. 10).

Conclusion: The animals primarily infected with *P. gingivalis* have the phenomenon of self-healing. The young animals can heal quickly after infection, but the adult animals have the tendency of forming chronic infection focus. This experiment has a reference value to the actual clinical situation, that is, generally, maybe teenagers are more likely to suffer from periodontal disease caused by the infection of *P. gingivalis*, but because it can be quickly repaired after infection, it does not cause serious local damage and get less attention in adolescence. High incidence rate of periodontal disease in adults may be explained by the delay of the course of infection and poor prognosis. So, a local damage is gradually getting worse, and later, it even causes local alveolar bone destruction and absorption, resulting in loosening of teeth. This example suggests that the prevention of *P. gingivalis* infection starts from childhood to adolescence.

subtype of *P. gingivalis* in bacterial suspension at $5\times10^{10}$ CFU/ml, the method was the same as that of Example 4.

Results: When the animals were attacked by the second time challenge, the areas of local lesions were larger than those of the first-time infection group (Table 2). In addition, the overall condition of the animals with the second infec-

TABLE 1

Investigation of local lesions caused by *P. gingivalis* infection in mice of different age groups

| Time post-challenge (days) | Average local lesion area in different age groups (unit: mm$^2$) | | | | |
|---|---|---|---|---|---|
| | G1 (4 weeks) | G2 (8 weeks) | G3 (12 weeks) | G4 (16 weeks) | G5 (20 weeks) |
| 0 | 0.00 | 0.00 | 0 | 0 | 0 |
| 1 | 2.60 | 0.00 | 6.86 | 0.00 | 4.17 |
| 2 | 169.60 | 81.40 | 51.14 | 31.00 | 49.67 |
| 3 | 189.90 | 185.50 | 101.14 | 62.50 | 91.83 |
| 4 | 196.90 | 195.80 | 117.29 | 96.67 | 91.83 |
| 5 | 215.30 | 202.10 | 126.57 | 105.83 | 119.00 |
| 6 | 230.80 | 216.00 | 129.00 | 114.33 | 124.50 |
| 7 | 242.60 | 228.30 | 116.29 | 122.50 | 131.00 |
| 8 | 239.60 | 229.00 | 98.00 | 118.33 | 127.83 |
| 9 | 235.50 | 200.70 | 90.14 | 105.67 | 93.00 |
| 11 | 181.50 | 143.90 | 68.29 | 88.00 | 76.83 |
| 13 | 140.60 | 98.50 | 46.57 | 67.33 | 60.83 |
| 15 | 26.45 | 56.00 | 4.71 | 38.33 | 10.00 |
| 17 | 3.60 | 18.25 | 9.43 | 21.67 | 8.00 |
| 20 | 0.00 | 0.30 | 7.14 | 14.50 | 4.17 |
| 23 | 0.00 | 0.00 | 5.29 | 11.83 | 0.00 |
| 30 | 0.00 | 0.00 | 0.14 | 6.00 | 0.00 |
| 35 | 0.00 | 0.00 | 0.00 | 0.67 | 0.00 |

Example 7

Repeat Infection of *P. gingivalis* Causes Local Aggravation and General Weakness The experimental results of Example 6 showed that the animals primarily infected with *P. gingivalis* had self-healing phenomenon, and the younger the animals were, the faster the recovery was. In clinical practice, periodontal disease often presents a state of intermittent progressive development. The purpose of this embodiment is to investigate the local and systemic harm caused by repeat chronic infections to the experimental animals by comparing the experimental animal models of single and repeat infections.

Figure 11B:
FIGS. 11A-11C show the damage caused by multiple infections of P. gingivalis, the details of which are described in Example 7.
Figure 11C:
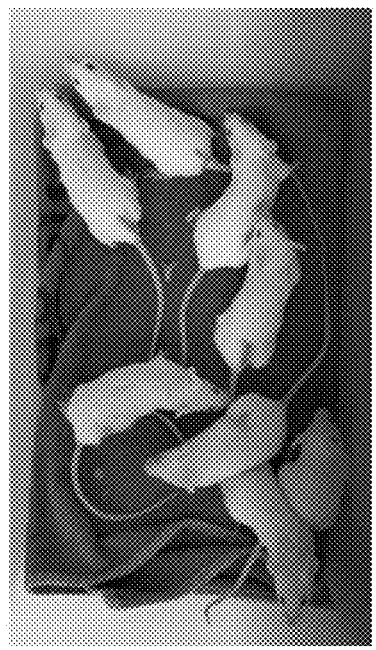
Figure 11A:
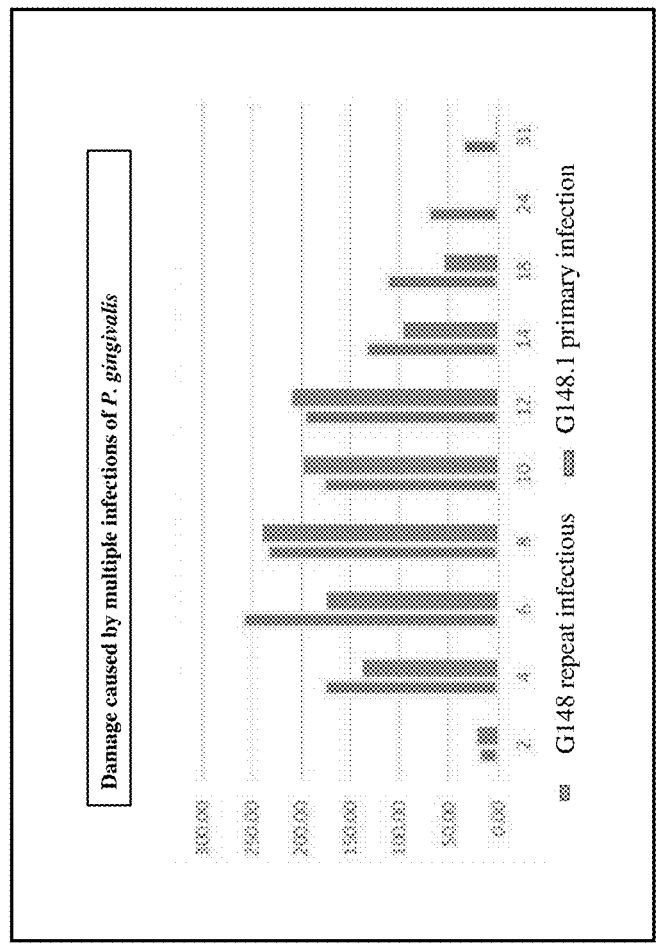

Specifically, mice of the same age, 8-10 weeks old and weighing 26-30 g, were divided into two groups. Group 148 (G148) was challenged by *P. gingivalis* QML subtype of $5\times10^{10}$ CFU/ml bacteria suspension, and group 148.1 (g148.1) was not attacked. After 40 days, the mice in group 148 (G148) who were attacked by bacteria were self-cured. At this time, the mice in group in group 148 (G148) and the mice in group 148.1 (g148.1) were both infected with QML tion showed a trend of weakness, which was manifested in dark hair, shrug, withered tail, slow recovery, and poor prognosis. Repeat infection experiments have been done in four major subtypes of *P. gingivalis*, and similar results have been obtained. The local lesions are shown in FIG. 11A, and the general condition of mice is shown in the video screenshot. FIG. 11B shows the video screenshot of the general condition of the mice in G148 group on the 24th day after being infected by the *P. gingivalis* QML subtype. FIG. 11C shows the video screenshot of the recovered mice in G148.1 group on the 24th day after being infected by the *P. gingivalis* QML subtype of for the first time.

TABLE 2

Comparison of the areas of soft tissue damage caused by *P. gingivalis* repeat infection and primary infection (unit: mm$^2$)

| Group | time post-challenge (days) | | | | | | | | | |
|---|---|---|---|---|---|---|---|---|---|---|
| | 2 | 4 | 6 | 8 | 10 | 12 | 14 | 18 | 24 | 31 |
| 148 repeat infection | 19.85 | 176.52 | 258.84 | 234.19 | 177.54 | 196.02 | 134.32 | 113.04 | 70.34 | 35.53 |
| 148.1 primary infection | 20.66 | 136.01 | 172.69 | 238.30 | 196.87 | 208.50 | 95.06 | 54.00 | 0.00 | 1.38 |

Conclusion: The results of animal experiments show that the persistent infection of *P. gingivalis* not only makes the local pathological changes worse, but also affects the general health. Clinically, periodontal disease not only causes tooth loosening and falling off, but also there are a large number of published clinical and statistical data on the correlation between periodontal disease and systemic diseases. Periodontal disease is an independent risk factor for coronary heart disease and its acute attack, and an independent risk factor for stroke. It has been found that the pathogenic bacteria of periodontal disease, *P. gingivalis* has a direct link to Alzheimer's disease. Whether chronic recurrent *P. gingivalis* infection can directly cause cardiovascular disease or Alzheimer's disease needs further data proof and research. The invention aims to solve the problem resulting from chronic infection by pathogenic bacteria using immunological method and prevent the long-term extension of pathogenic bacteria from endangering the general health.

Example 8

Discovery of Combination Vaccine

This embodiment was an initial attempt in the discovering of combined vaccine for its immune protection function. At first, the purpose of the experiment was to investigate whether there was immune cross protection between different subtypes of *P. gingivalis* outer membrane protein RagB. Therefore, RagB bivalent vaccine, including W50ragB protein, (more details about protein sequence, protein purification and other production methods similar to those presented in Example 3, can be found in PCT/GB2005/001976, the content of which is incorporated here by reference) and QMLragB protein (more details about protein sequence, protein purification and other production methods similar to those presented in Example 3, can be found in PCT/GB2005/001976, the content of which is incorporated here by reference) was prepared at the mass ratio of 1:1. After second immunization, Cra4S1 protein (Cra4S1 protein prepared in Example 3) was added, and each protein was given three times of immunization opportunities. Adding Cra4S1, a common antigen of all subtypes, is to investigate whether the new combined vaccine can affect the immune protection effect of RagB vaccine.

Immune scheme, the purified Cra4S1 protein described in Example 3 and different subtype RagB protein were used to immunize animals (Table 3-1, Table 3-2). Mice aged 6-7 weeks and weighing 18-22 g were divided into three groups. The first group (divided into three sub-groups: G11, G14 and G17) animals were immunized with QMLragB protein and W50ragB protein; the second group (divided into three sub-groups: G12, G15 and G18) animals were immunized with combination vaccine containing QMLragB protein, W50ragB protein and Cra4S1 protein; the third group (divided into three sub-groups: G13, G16 and G19) animals were not immunized as control. The final formula of the combination vaccine of the embodiment is Cra4S1 protein: W50ragB protein: QMLragB protein, with a mass ratio of 1:1:1.

Specifically, each mouse was intraperitoneally injected with 100 μl recombinant protein solution. The first group (G11, G14 and G17) used 100 μl solution containing 5-50 μg W50ragB protein, 5-50 μg QMLragB protein and 250 μg aluminum adjuvant, which was implemented according to the immunization plan in Table 3-1; the second group (G12, G15 and G18) used 100 μl solution containing 5 μg Cra4S1 protein, 5-50 μg W50ragB protein, 5-50 μg QMLragB protein, and 250 μg aluminum adjuvant according to Table 3-2; the third group (G13, G16 and G19) was control without vaccination. The interval between immunizations was 3-4 weeks. Serum antibody titers were detected before immunization and during antibody production. After the three times of immunization, the titer of the specific antibody was detected by ELISA, and when the titer of the antibody was higher than 1:100000, bacterial challenge experiment can be carried out, by the method as described in Example 4.

TABLE 3-1

G11/G14/G17 immunization plan

| | First immunization | Second immunization | Third immunization |
|---|---|---|---|
| G11 G14 G17 | W50ragB: 50 μg QMLragB: 50 μg | W50ragB: 50 μg QMLragB: 50 μg | W50ragB: 5 μg QMLragB: 5 μg |

TABLE 3-2

G12/G15/G18 immunization plan

| | First immunization | Second immunization | Third immunization | Fourth immunization | Fifth immunization |
|---|---|---|---|---|---|
| G12 G15 G18 | W50ragB: 50 μg QMLragB: 50 μg | W50ragB: 50 μg QMLragB: 50 μg | W50ragB: 5 μg QMLragB: 5 μg Cra4S1: 5 μg | Cra4S1: 5 μg | Cra4S1: 5 μg |

TABLE 3-3

Comparison of immune protection function between combined vaccine and RagB vaccine

| | | | 7 Days post-challenge | | 9 Days post-challenge | | 11 Days post-challenge | |
|---|---|---|---|---|---|---|---|---|
| Subtype *P. gingivalis* | Group | Vaccine | Average lesion area mm$^2$ | Standard deviation | Average lesion area mm$^2$ | Standard deviation | Average lesion area mm$^2$ | Standard deviation |
| *P. gingivalis* W50 | G11 | W50ragB QMLragB | 82.04 | 9.11 | 65.79 | 29.69 | 69.17 | 28.67 |
| | G12 | W50ragB QMLragB Cra4S1 | 82.72 | 14.35 | 58.76 | 12.81 | 55.47 | 12.34 |
| | G13 | N/A | 119.35 | 65.36 | 73.02 | 22.16 | 73.43 | 26.89 |

TABLE 3-3-continued

Comparison of immune protection function between combined vaccine and RagB vaccine

| Subtype P. gingivalis | Group | Vaccine | 7 Days post-challenge | | 9 Days post-challenge | | 11 Days post-challenge | |
|---|---|---|---|---|---|---|---|---|
| | | | Average lesion area mm² | Standard deviation | Average lesion area mm² | Standard deviation | Average lesion area mm² | Standard deviation |
| P. gingivalis Thai | G14 | W50ragB QMLragB | 109.66 | 31.77 | 108.66 | 35.47 | 102.30 | 30.09 |
| | G15 | W50ragB QMLragB Cra4S1 | 107.26 | 32.37 | 173.09 | 13.92 | 136.37 | 26.00 |
| | G16 | N/A | 97.48 | 37.11 | 133.26 | 57.18 | 116.35 | 43.97 |
| P. gingivalis QML | G17 | W50ragB QMLragB | 78.21 | 10.68 | 101.99 | 8.49 | 99.39 | 15.02 |
| | G18 | W50ragB QMLragB Cra4S1 | 81.52 | 11.96 | 86.42 | 14.61 | 86.83 | 10.95 |
| | G19 | N/A | 112.74 | 63.33 | 123.86 | 60.46 | 134.16 | 84.84 |

Results: The animals were immunized with W50ragB and QMLragB proteins, and then Cra4S1 protein was added to vaccine formula to form new combination. The immune protection function of combined vaccine was significantly enhanced in response to the challenge of P. gingivalis subtypes (W50 subtype and QML subtype), which showed that the soft tissue lesion areas were smaller than those of the control group (Table 3-3). In FIG. 12, the abscissa is G17 (W50ragB and QMLragB mixed vaccine), G18 (combination vaccine contains Cra4S1 protein, W50ragB protein and QMLragB protein), G19 (control group of mice not immunized), and the challenge bacteria is P. gingivalis QML subtype.

In Table 3-3, the animals immunized with bivalent vaccines containing W50ragB and QMLragB bivalent vaccines or W50ragB, QMLragB and Cra4S1 trivalent combination vaccines did not show the immune protection effect on the P. gingivalis Thai subtype, and the local damage of the trivalent combination vaccine was even more serious than the other two groups.

Conclusion and analysis: This example is the initial attempt of combined vaccine. The reason for the decrease of vaccine dosage is that the vaccine dose-dependent experiment was conducted at the same time. In fact, the follow-up study found that high titer antibody can also be produced when the vaccination dosage of four RagB proteins in the range of 0.5-5 µg. The preliminary experiment is further improved, the results lay the foundation for the follow-up study.

The results of this embodiment show that the combined vaccine not only enhances the immune protection effect, but also improves the stability of the product. This phenomenon suggests that the combination of two proteins with different targets can improve the efficacy of the product. The principle that the combined vaccine enhances the immune effect and stability may be related to the fact that the two subunits of RagA and RagB are controlled by the same transcription factor. When the targets of the two interrelated subunits on the bacterial surface are occupied by antibodies, a more stable sub structure could be formed, and the binding of antigen and antibody limits the function of bacterial outer membrane protein. Another hypothesis is that the firm binding of two antigens and antibodies is more likely to trigger the body to play a better immune synergy/coordination to eliminate and inhibit pathogens.

Initially, when the recombinant Cra4S1 protein was successfully expressed, it was noted that Cra4S1 protein alone could be used to immunize animals to obtain high titer specific antibodies. In several separate experiments, it was also observed that the local soft tissue damage in the immunized animal group was more serious than that in the control group, indicating that Cra4S1 may be involved in hypersensitivity reaction, and cra4s1 protein is not considered to be a good candidate vaccine. In more than two years of practice, in vitro antibody experiments showed that if animals were immunized with RagB vaccine and then attacked with P. gingivalis, the collected serum antibody had a certain degree of immune cross reaction with recombinant Cra4S1 protein. This phenomenon shows that when RagB antibody reacts with P. gingivalis outer membrane protein RagB, the original spatial structure of cra4s1 protein changes and its antigenicity is exposed, which creates an opportunity for the reaction of two target antigens and antibodies.

This embodiment also proves that RagB vaccine only protects the corresponding P. gingivalis subtype, the combination vaccine of Cra4S1 and RagB only plays an immune protection role for the corresponding P. gingivalis subtype. For example, the combination vaccine of Cra4S1 and QML-ragB protects the body against the challenge of QML subtype of P. gingivalis but has no protective effect on Thai subtype of P. gingivalis.

Therefore, the combination vaccine described in this embodiment needs to contain the RagB protein (different subtypes) and Cra4S1 of P. gingivalis, and the combination of the two molecules can enhance the immune protection function and stability. The combination vaccine is a new concept. The following embodiment further verifies and applies the combination vaccine.

Example 9

Investigation on the Immunoprotective Effect of Combined Vaccine on Infected Animals Clinically, in most cases, patients with discomfort decide to go to the dentist, and periodontal disease/peri-implant inflammation is already in a serious state. In this embodiment, the immune protective effect of combined vaccine on P. gingivalis infected animals was discussed.

Specifically, mice 3-4 weeks old and weighing 12-16 g were divided into 5 groups (Table 4), with 5-6 mice in each group. Four groups of mice were subcutaneously injected with 200 μl low-dose *P. gingivalis* W50 subtype bacterial suspension (5*10$^8$ CFU/ml) on the back, resulting in mild infection. The diet and activities of infected mice were normal. After bacterial attack, some animals had slight weight loss, and then their weight continued to grow. One week later, infected mice could have small local lesions. Group 5 uninfected mice were used as control. The mice were fed for 4 weeks and then vaccinated.

Figure 13:
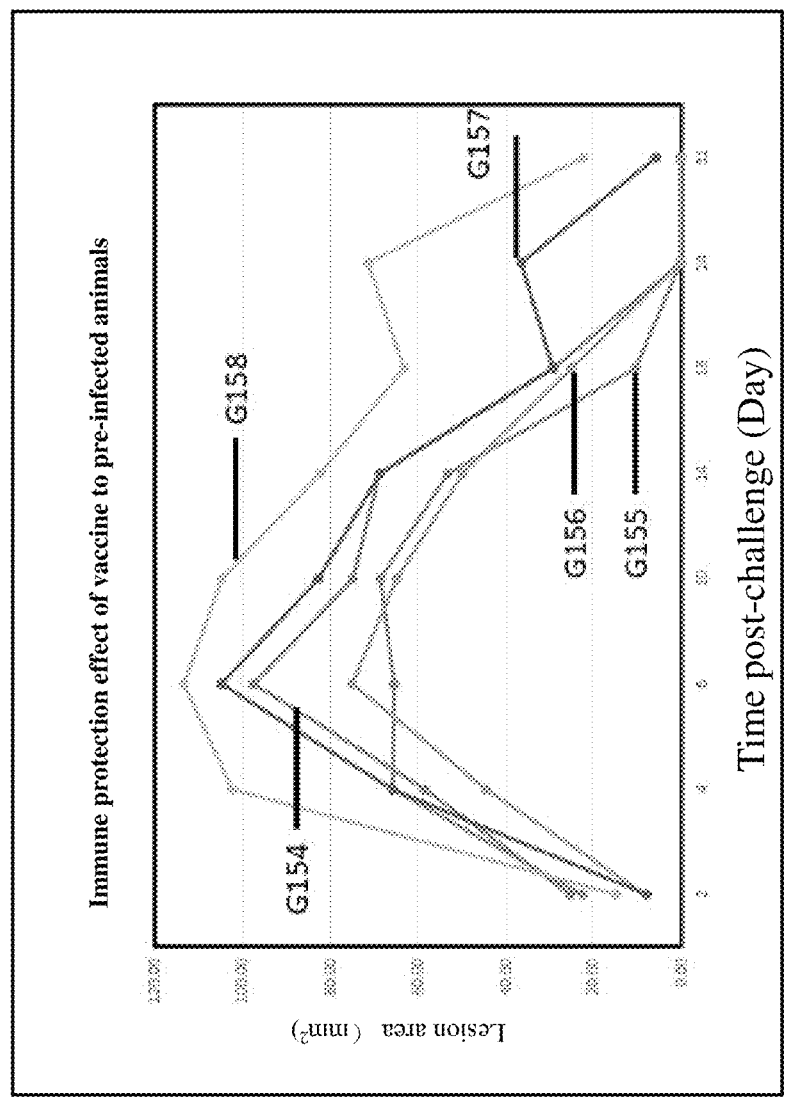
FIG. 13 shows a local immune protection effect of vaccine to pre-infected animals, the details of which are described in Example 9, the abscissa being the days after challenge, and the ordinate being the area of skin and soft tissue lesions ($mm^2$).
Figure 14B:
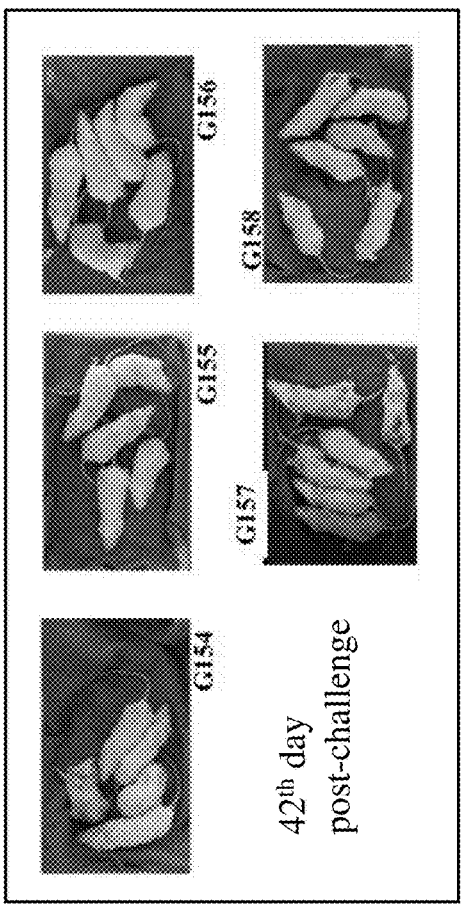
FIGS. 14A and 14B show systemic immune protective effect of vaccine to pre-infected animals, the details of which are described in Example 9, screenshots from a video recorded on the 24th day and 42th day post-challenge animals, G154 immunized with monovalent vaccine W50ragB, G155 immunized with mixed vaccine W50ragB+
Figure 14A:
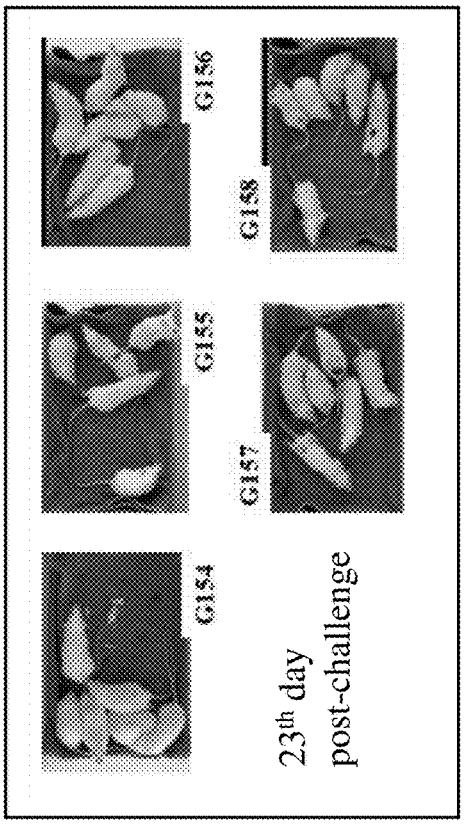

5, FIG. 13 and FIGS. 14A & 14B). Especially in the process of animal recovery, the video screenshot in FIGS. 14A & 14B shows the state of the animal. The mice receiving the vaccine were in good physical condition, with smooth hair, balanced body and free movement, while the mice in the control group were difficult to recover from body surface ulcer, dull hair and slow movement. There was no significant change in body weight between the experimental group and the control group.

TABLE 4

Post infection immunization test plan for G154-G158 in 2019

| Group name | Group size | Pre-infection | Vaccine | Dose | Interval | Subtype *P. gingivalis* |
|---|---|---|---|---|---|---|
| G154 | 7 | Yes | W50ragB protein | 1 μg | 4 w/3 w/4 w | W50 |
| G155 | 6 | Yes | Cra4S1 protein | 0.5 μg | 4 w/3 w/4 w | W50 |
| G156 | 7 | Yes | W50ragB protein Cra4S1 protein | 1 μg + 0.5 μg | 4 w/3 w/4 w | W50 |
| G157 | 7 | Yes | N/A | / | / | W50 |
| G158 | 7 | N/A | N/A | / | / | W50 |

TABLE 5

Immune the mean values in protection experiments (unit: mm$^2$) and standard deviation of lesion area post-infection

| | Time (Days) | | | | | | | | | |
|---|---|---|---|---|---|---|---|---|---|---|
| | 4 | | 10 | | 14 | | 24 | | 31 | |
| Group | AVG | STDEV | AVG | STDEV | AVG | STDEV | AVG | STDEV | AVG | STDEV |
| G154 | 58.28 | 21.48 | 74.67 | 17.68 | 68.58 | 19.47 | 0.00 | 0.00 | 0.00 | 0.00 |
| G155 | 65.57 | 24.13 | 68.37 | 28.91 | 53.03 | 25.61 | 0.00 | 0.00 | 0.00 | 0.00 |
| G156 | 44.31 | 16.20 | 64.67 | 26.99 | 49.64 | 16.95 | 0.00 | 0.00 | 0.00 | 0.00 |
| G157 | 102.15 | 62.30 | 104.51 | 65.55 | 82.08 | 51.03 | 71.22 | 155.69 | 22.15 | 54.25 |
| G158 | 65.69 | 8.16 | 82.51 | 36.35 | 68.51 | 28.25 | 36.34 | 77.31 | 5.56 | 11.37 |

The infected animals were divided into four groups according to the plan including vaccine dose and immunization time listed in Table 4. G154 group was immunized with W50ragB protein, G155 group was immunized with Cra4S1 Protein, and G156 group was immunized with Cra4S1 and W50ragB mixed vaccine. G157 group was a control group with mild infection but not vaccinated, and G158 group was a same batch non-infected control.

After three times of immunization, one mouse in each group was selected for blood collection to detect the antibody titre, and then the animals were challenged with *P. gingivalis* W50 subtype according to the method described in Example 4. The concentration of bacterial suspension was 5×10$^{10}$ CFU/ml, and 200 μl was injected subcutaneously into the back. After bacterial challenge, the weight, behaviour and local soft tissue injury of mice were recorded, and regular general condition videos were recorded.

Results: both monovalent and combination vaccine immunized animals in the pre-infected animal group showed that the damage degree of local soft tissue was lower than that in the control group and uninfected control group (Table 5 and FIG. 13). The records of the animal group receiving the vaccine on the 24th day after infection showed that it had been cured. The indexes of the combined vaccine group were better than the monovalent vaccine, and the prognosis of the control group was poor.

In this embodiment, the phenomenon described in Example 7 also occurs, that is, the local damage of animals repeatedly infected with *P. gingivalis* is more serious (Table Conclusion: in the Example 7, it shows that repeated infection with *P. gingivalis* will not only lead to progressive local injury, but also affect the overall health. Table 5 shows that when the combined vaccine is used for pre-infected animals, the immune protection show that the degree of local lesions decreases, the mean value of lesion area (AVG) decreases, and the standard deviation (STDEV) of data is at a low level, and the immunized animals are in good condition. These results show that the combined vaccine can play an effective immune protective role in healthy people or infected people. Similar experiments were carried out on four major *P. gingivalis* subtypes. These data indicate that the use of the patented technology combination vaccine of the invention is beneficial to general health and has a wide market demand.

Example 10

Investigation of the Passive Immune Protection Function of Specific Double Target Antibody The purpose of this study was to explore whether passive immunization (i.e. injection of specific antibodies) can play a safe and effective role in immune protection. In fact, as a therapeutic drug, antibodies are usually targeted at infected patients, therefore, this embodiment analyzes both uninfected and infected animals.

Specifically, the scheme for preparing mouse specific antiserum is shown in Table 6-1 (more details about protein sequence, protein purification and other production methods similar to those presented in Example 3, can be found in PCT/GB2005/001976, the content of which is incorporated here by reference). After three times of immunization, the titer of specific antibodies in serum was determined by indirect ELISA. Finally, blood was collected, and the polyclonal antibodies were stored in the refrigerator at −20° C.

TABLE 6-1

Polyclonal antibody immunization plan

| Polyclonal antibody | Animals | First immunization | Second immunization | Third immunization |
|---|---|---|---|---|
| Anti-ThairagB serum | Balb/C mice, Male 5-6 weeks old, weight 16-20 g, 5-8 mice/group | ThairagB: 0.5 µg | ThairagB: 0.5 µg | ThairagB: 0.5 µg |
| Anti-Cra4S1 serum | | Cra4S1: 1 µg | Cra4S1: 1 µg | Cra4S1: 1 µg |
| Anti-ThairagB + Cra4S1 serum | | ThairagB: 0.5 µg Cra4S1: 1 µg | ThairagB: 0.5 µg Cra4S1: 1 µg | ThairagB: 0.5 µg Cra4S1: 1 µg |

The grouping of animal experiments is shown in Table 6-2. Mice in G361, G362, G363, G364 and G369 groups received pre-infection, and 200 µl bacterial suspension ($5\times10^8$ CFU/ml) was injected subcutaneously into the back of mice. Mice in G370, G371, G372, G373, and G374 groups were not infected.

Specifically, these mice were 9-10 weeks old and weighed 28-32 g. Four days before and one day before the bacterial challenge, 100 µl antibody solution containing 200 µg mouse serum was injected into the abdominal cavity of experimental mice according to the experimental plan in Table 6, and then the bacterial challenge experiment was carried out, following the method described in Example 4. The weight and behaviour of mice before and after the challenge were observed and recorded, the development of subcutaneous soft tissue injury was recorded, and the area of skin injury was measured (Table 7).

TABLE 6-2

Animal grouping information for antibody passive immune protection

| Group name | size | Pre-infection | Polyclonal antibody | Dose | Volume |
|---|---|---|---|---|---|
| G361 | 8 | yes | Anti-ThairagB serum | 200 µg/mouse | 100 µl |
| G362 | 8 | yes | Anti-ThairagB + Cra4S1 serum | 200 µg/mouse | 100 µl |
| G363 | 8 | yes | Anti-Cra4S1 serum | 200 µg/mouse | 100 µl |
| G364 | 8 | yes | Normal serum | 200 µg/mouse | 100 µl |
| G369 | 8 | yes | PBS | N/A | 100 µl |
| G370 | 4 | no | Anti-ThairagB serum | 200 µg/mouse | 100 µl |
| G371 | 4 | no | Anti-ThairagB + Cra4S1 serum | 200 µg/mouse | 100 µl |
| G372 | 5 | no | Anti-Cra4S1 serum | 200 µg/mouse | 100 µl |
| G373 | 6 | no | Normal serum | 200 µg/mouse | 100 µl |
| G374 | 6 | no | PBS | N/A | 100 µl |

TABLE 7

Record of average lesion area in antibody passive immunoprotection experiment (unit: $mm^2$)

| Group | post-challenge time | | | | | | | | | | | |
|---|---|---|---|---|---|---|---|---|---|---|---|---|
| | 0 | 2 | 4 | 6 | 8 | 10 | 12 | 14 | 17 | 21 | 28 | 32 |
| G361 | 0 | 184.27 | 124.91 | 166.74 | 236.72 | 197.79 | 156.33 | 106.04 | 61.23 | 31.05 | 13.88 | 0.00 |
| G362 | 0 | 195.08 | 95.38 | 180.54 | 186.96 | 152.41 | 97.08 | 44.43 | 12.53 | 4.37 | 2.02 | 0.00 |
| G363 | 0 | 239.75 | 194.29 | 249.85 | 265.03 | 221.80 | 141.58 | 90.64 | 28.71 | 3.51 | 0.00 | |
| G364 | 0 | 251.98 | 183.93 | 230.06 | 212.13 | 164.39 | 99.88 | 59.84 | 13.06 | 10.28 | 4.05 | 0.00 |
| G369 | 0 | 206.68 | 139.09 | 219.30 | 210.55 | 202.80 | 140.63 | 86.03 | 21.47 | 2.77 | 0.00 | |
| G370 | 0 | 116.42 | 109.95 | 118.07 | 136.79 | 113.62 | 82.43 | 70.07 | 71.08 | 0.00 | 448.97 | 110.89 |
| G371 | 0 | 155.34 | 131.54 | 172.22 | 195.88 | 217.62 | 157.67 | 101.65 | 43.61 | 8.39 | 0.00 | 0.00 |

TABLE 7-continued

Record of average lesion area in antibody passive immunoprotection experiment (unit: mm²)

| Group | post-challenge time | | | | | | | | | | |
|---|---|---|---|---|---|---|---|---|---|---|---|
| | 0 | 2 | 4 | 6 | 8 | 10 | 12 | 14 | 17 | 21 | 28 | 32 |
| G372 | 0 | 291.57 | 246.22 | 252.10 | 285.31 | 282.30 | 207.49 | 140.88 | 81.25 | 8.66 | 0.84 | 5.07 |
| G373 | 0 | 457.47 | 294.04 | 324.44 | 433.62 | 419.36 | 341.65 | 171.24 | 55.08 | 7.16 | 0.00 | 0.00 |
| G374 | 0 | 243.82 | 262.59 | 270.86 | 297.03 | 307.68 | 151.93 | 90.18 | 19.20 | 0.00 | 0.00 | 0.00 |

Results: The mortality of the experimental animals was higher than expected in this embodiment when the animals were challenge with conventional doses of bacteria, and it should be noted that all animals in this embodiment have an intraperitoneally injection. The challenge dose of P. gingivalis designed in this project has been tested repeatedly, and the death of infected animals rarely occurs. In this example, in FIG. 15A, all animals did not have pre-infection. Some animals died in group G370 injected with anti-ThaiRagB antibody, G372 injected with anti-Cra4S1 antibody, G373 control group injected with normal serum and G374 control group injected with PBS, the mortality rates were 75% (¾), 40% (⅖), 33.3% (⅔) and 50% (⅜), respectively, while no animal death occurred in the G371 which injected with serum of the combined antibody group (anti-ThairagB and anti Cra4S1). In this example, FIG. 15B shows that G364 normal serum control and G369 PBS control have higher mortality rates, which are 37.5% (⅜) and 62.5% (⅝), respectively, the mortality rates of G361 injected with anti-ThaiRagB, G362 the combined antibodies of ThairagB and Cra4S1 were 25% (⅖) and 12.5% (⅛), respectively. All the animals in G363 group with anti-Cra4S1 antibody survived.

In FIGS. 16A and 16B, animals in the specific combined antibody group sustained the local lesions in a lower range of than the surviving animals in other groups in both pre-infected and uninfected animals did, in these two sets of experiments, only one death occurred in the pre-infected group. The severity of local lesions in the anti-ThairagB serum group was lower than that in the control group, however, only one animal survived in the uninfected group, which was difficult to evaluate the real situation of the whole group.

The anti-Cra4S1 antibody group showed an elusive phenomenon. Particularly, when animals received the antibody, their survival rate was the highest, and there was no death. However, the local lesions were more serious than those in the anti-ThairagB and the combined antibody (anti-ThairagB and anti-Cra4S1) groups (FIGS. 16A and 16B).

Conclusion: the experimental results of Example 10 show that the combined antibody (anti-ThaiRagB and anti-Cra4S1) provides a stable, safe and efficient protection from the infection of P. gingivalis, demonstrating an immunoprotective effect on both uninfected and pre-infected experimental animals (FIGS. 16A and 16B). The use of anti-ThairagB antibody and anti-Cra4S1 antibody alone had uncertainty in therapeutic. The experimental results of this example suggest that when a single target antibody reacts with the antigen molecules on the surface of the bacteria, there may be a structural instability, so the antibody efficacy is defective. When double target specific antibodies are used, the combined antibodies occupy the antigen targets of the main outer membrane proteins specifically, and block the function of outer membrane proteins, so as to achieve the effect of inhibiting and eliminating bacteria and reducing bacterial virulence.

In summary, Cra4S1 an important outer membrane protein component of P. gingivalis, is discovered and confirmed by the present disclosure; the expression of Cra4S1 protein is achieved; the theory of combined vaccine and double target specific antibody is proposed by combining Cra4S1 with specific/characteristic outer membrane protein RagB of bacteria; and the experimental data disclosed herein prove that the innovative product demonstrate effective and stable inhibition against bacteria. The new technology has prospects of a wide industrial application.

The above is only the preferred embodiment of the invention. It should be noted that for those skilled in the art, without departing from the principles of the invention, several improvements and refinements can be made. These improvements and refinements should also be considered as the protection scope of the invention.

What is claimed is:

1. A synthetic cra4S1 gene consisting of a nucleotide sequence as shown in SEQ ID No.1.

2. An expression cassette, a recombinant vector or a cell comprising the synthetic cra4S1 gene of claim 1, wherein the synthetic cra4S1 gene encodes a Cra4S1 protein consisting of an amino acid sequence as shown in SEQ ID NO.2.

3. A composition for immune protection comprising the Cra4S1 protein of claim 2 and one or more W50ragB proteins, thairagB protein, QMLragB protein and 381ragB protein of *P. gingivalis*.

4. The composition of claim 3, wherein a mass ratio of Cra4S1 protein to W50ragB protein is in the range of 1:2 to 1:8, or a mass ratio of Cra4S1 protein to ThairagB protein is in the range of 1:1 to 1:6, or a mass ratio of Cra4S1 protein to QMLragB protein is in the range of 1:1 to 1:6, or a mass ratio of Cra4S1 protein to 381ragB protein is in the range of 1:2 to 1:9.

5. An antibody comprising an antibody against the Cra4S1 protein of claim 2, and an antibody against one or more W50ragB proteins, thairagB protein, QMLragB protein and 381ragB protein of *P. gingivalis*.

6. A method of preventing or treating a medical condition associated with *Porphyromonas gingivalis* infection, comprising administering to a subject in need, an effective amount of the composition of claim 3.

7. A method of preventing or treating a medical condition associated with *Porphyromonas gingivalis* infection, comprising administering to a subject in need, an effective amount of the antibody combination of claim 5.

8. A method of preventing or treating a medical condition with *Porphyromonas gingivalis* infection, comprising administering to a subject in need, an effective amount of the composition of claim 4.

9. The composition of claim 3, wherein the composition is a vaccine or medicine used to prevent occurrence or relapse or treating periodontitis or peri-implantitis inflammation or an infection related to *Porphyromonas gingivalis*.

10. The composition of claim 4, wherein the composition is a vaccine or medicine used to prevent occurrence or relapse or treating periodontitis or peri-implantitis inflammation or an infection related to *Porphyromonas gingivalis*.

* * * * *